(12) United States Patent
Korach

(10) Patent No.: US 10,281,252 B2
(45) Date of Patent: May 7, 2019

(54) LAUNCHER REDUNDANT TANK MASS SHEDDING SYSTEM

(71) Applicant: Haim Korach, Tel Aviv (IL)

(72) Inventor: Haim Korach, Tel Aviv (IL)

( * ) Notice: Subject to any disclaimer, the term of this patent is extended or adjusted under 35 U.S.C. 154(b) by 133 days.

(21) Appl. No.: 15/120,572

(22) PCT Filed: Nov. 25, 2015

(86) PCT No.: PCT/IL2015/051144
§ 371 (c)(1),
(2) Date: Aug. 22, 2016

(87) PCT Pub. No.: WO2016/098098
PCT Pub. Date: Jun. 23, 2016

(65) Prior Publication Data
US 2018/0202786 A1     Jul. 19, 2018

(30) Foreign Application Priority Data
Dec. 15, 2014  (IL) .......................... 236287

(51) Int. Cl.
| F42B 15/38 | (2006.01) |
| F42B 15/36 | (2006.01) |
| F02K 9/60  | (2006.01) |
| B64G 1/22  | (2006.01) |

(52) U.S. Cl.
CPC .............. *F42B 15/38* (2013.01); *F02K 9/605* (2013.01); *F42B 15/36* (2013.01); *B64G 1/222* (2013.01)

(58) Field of Classification Search
CPC .......... F42B 15/36; F42B 15/38; B64G 1/641; B64G 1/645; B64G 1/64; B64G 1/222
See application file for complete search history.

(56) References Cited

U.S. PATENT DOCUMENTS

| 2,996,316 A | * | 8/1961 | Terhune .................. F42B 15/36 285/33 |
| 2,996,985 A |   | 8/1961 | Kratzer |
| 3,043,221 A |   | 7/1962 | Swanser |
| 3,067,575 A |   | 12/1962 | Corbett |
| 3,127,739 A |   | 4/1964 | Miller |
| 3,131,635 A |   | 5/1964 | Steinmetz et al. |
| 3,139,031 A |   | 6/1964 | Schroter et al. |
| 3,230,885 A | * | 1/1966 | Weber ..................... F42B 15/38 403/11 |
| 3,245,485 A |   | 4/1966 | Bell |

(Continued)

FOREIGN PATENT DOCUMENTS

| DE | 102010011553 B4 | 9/2011 | |
| EP | 1361411 A2 * | 11/2003 | ............. B64G 1/645 |

(Continued)

OTHER PUBLICATIONS

International Search Report and Written Opinion in PCT/IL2015/051144 dated Feb. 16, 2016.

*Primary Examiner* — Benjamin P Lee
(74) *Attorney, Agent, or Firm* — Manelli Selter PLLC; Edward J. Stemberger

(57) ABSTRACT

A system and method for shedding redundant launcher tank mass, comprising progressing means, and cutting means configured to cut redundant propellant tank wall, the system configured to progress inside the tank, along the tank wall in an initially predetermined rate.

29 Claims, 25 Drawing Sheets

(56) References Cited

U.S. PATENT DOCUMENTS

| | | | | |
|---|---|---|---|---|
| 3,250,216 | A | | 5/1966 | Typaldos |
| 3,302,569 | A | * | 2/1967 | Newcomb ............. F16L 37/002 |
| | | | | 285/18 |
| 3,308,624 | A | | 3/1967 | Ciancitto |
| 3,427,047 | A | * | 2/1969 | Mayo .................... F16L 37/148 |
| | | | | 102/378 |
| 3,505,925 | A | * | 4/1970 | Carr ......................... B64D 1/02 |
| | | | | 102/378 |
| 3,903,803 | A | * | 9/1975 | Losey ..................... F42B 15/36 |
| | | | | 102/378 |
| 4,120,519 | A | * | 10/1978 | Bridges .................. F42B 15/36 |
| | | | | 285/3 |
| 4,648,227 | A | * | 3/1987 | Reusch .................... B64D 1/00 |
| | | | | 102/378 |
| 4,703,694 | A | | 11/1987 | Corbett et al. |
| 4,723,736 | A | | 2/1988 | Rider |
| 6,148,729 | A | * | 11/2000 | Smith ..................... F42B 15/38 |
| | | | | 102/307 |
| 6,390,416 | B2 | * | 5/2002 | Holemans .............. B64G 1/641 |
| | | | | 244/173.3 |
| 7,127,994 | B2 | * | 10/2006 | Cleveland ............. B64G 1/645 |
| | | | | 102/378 |
| 7,210,282 | B1 | | 5/2007 | Floyd |
| 8,607,705 | B2 | * | 12/2013 | Golden ................... F42B 15/38 |
| | | | | 102/377 |
| 8,607,706 | B2 | * | 12/2013 | Kister .................... B64G 1/645 |
| | | | | 102/335 |
| 2008/0163748 | A1 | * | 7/2008 | Facciano ................ F42B 15/38 |
| | | | | 89/36.01 |
| 2012/0110823 | A1 | * | 5/2012 | Behar .................... B64G 1/645 |
| | | | | 29/428 |
| 2016/0033069 | A1 | * | 2/2016 | Buttolph ............... F16L 37/101 |
| | | | | 403/320 |
| 2017/0225808 | A1 | * | 8/2017 | Echelman ............. B64G 1/645 |
| 2018/0251220 | A1 | * | 9/2018 | Medina .................... B64D 1/02 |

FOREIGN PATENT DOCUMENTS

| | | | | |
|---|---|---|---|---|
| FR | 3017205 | A1 * | 8/2015 | ............. B64G 1/645 |
| FR | 3009282 | B1 * | 6/2017 | |
| WO | WO-2015014942 | A1 * | 2/2015 | ............. B64G 1/641 |

* cited by examiner

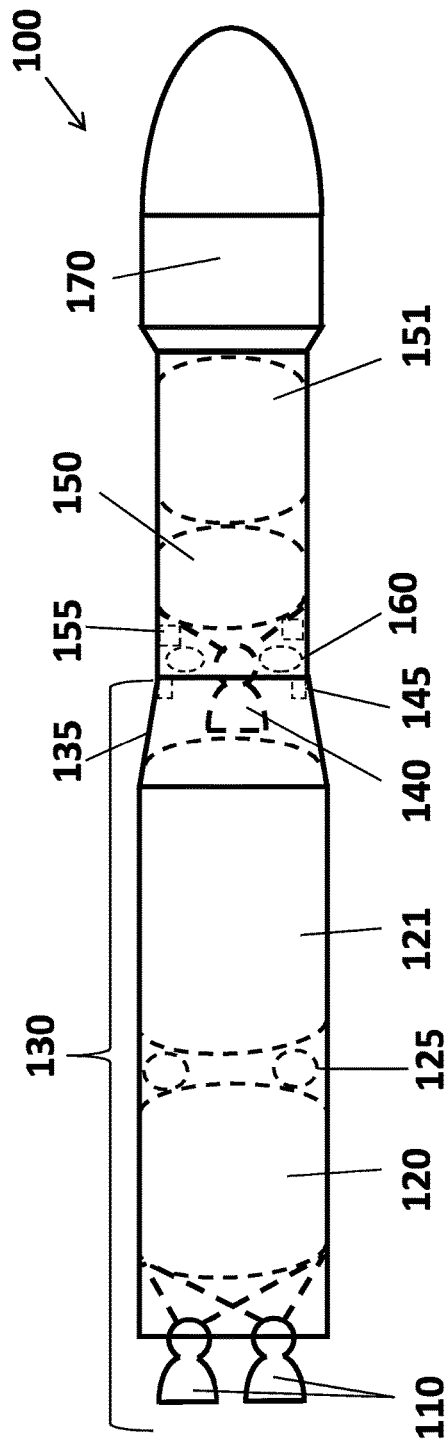
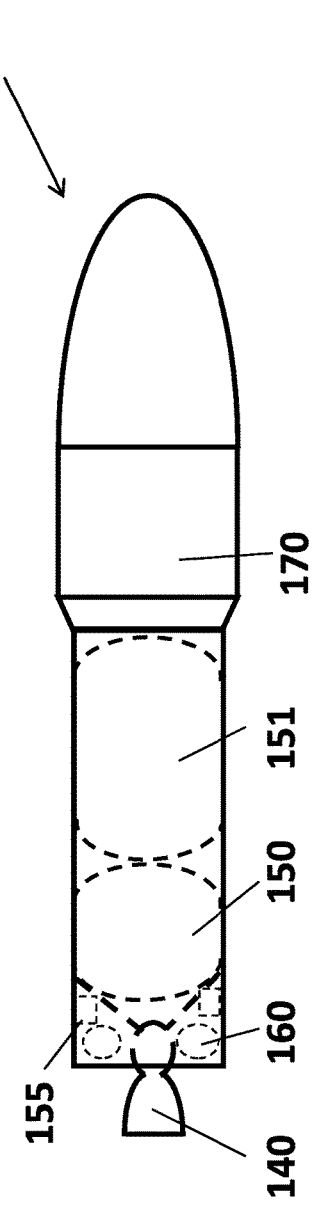
Fig. 1A (prior art)
Fig. 1B (prior art)

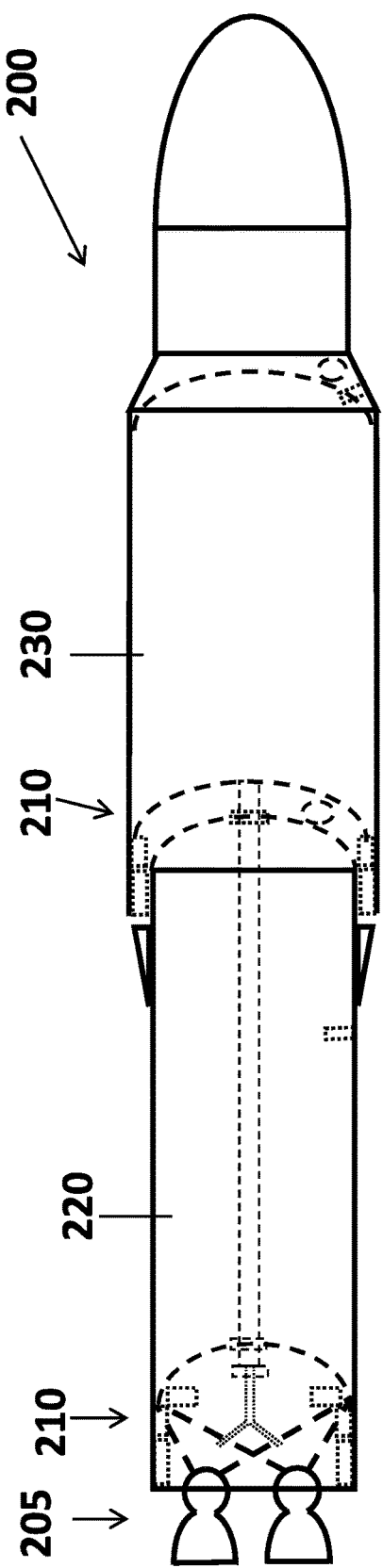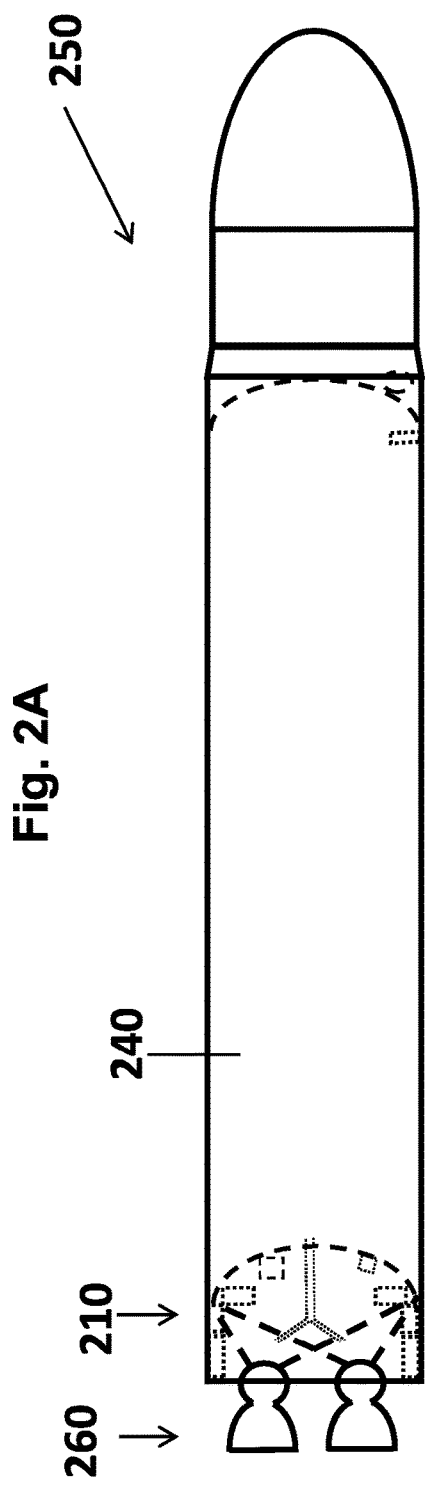
Fig. 2A
Fig. 2B

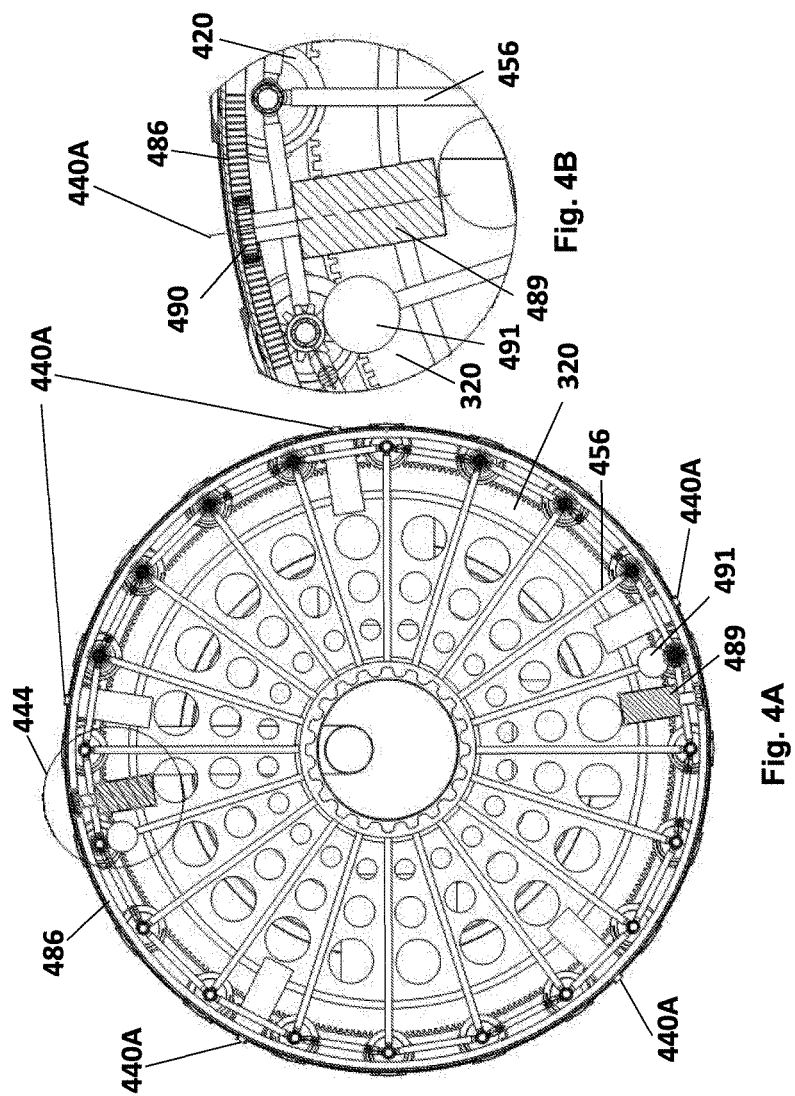

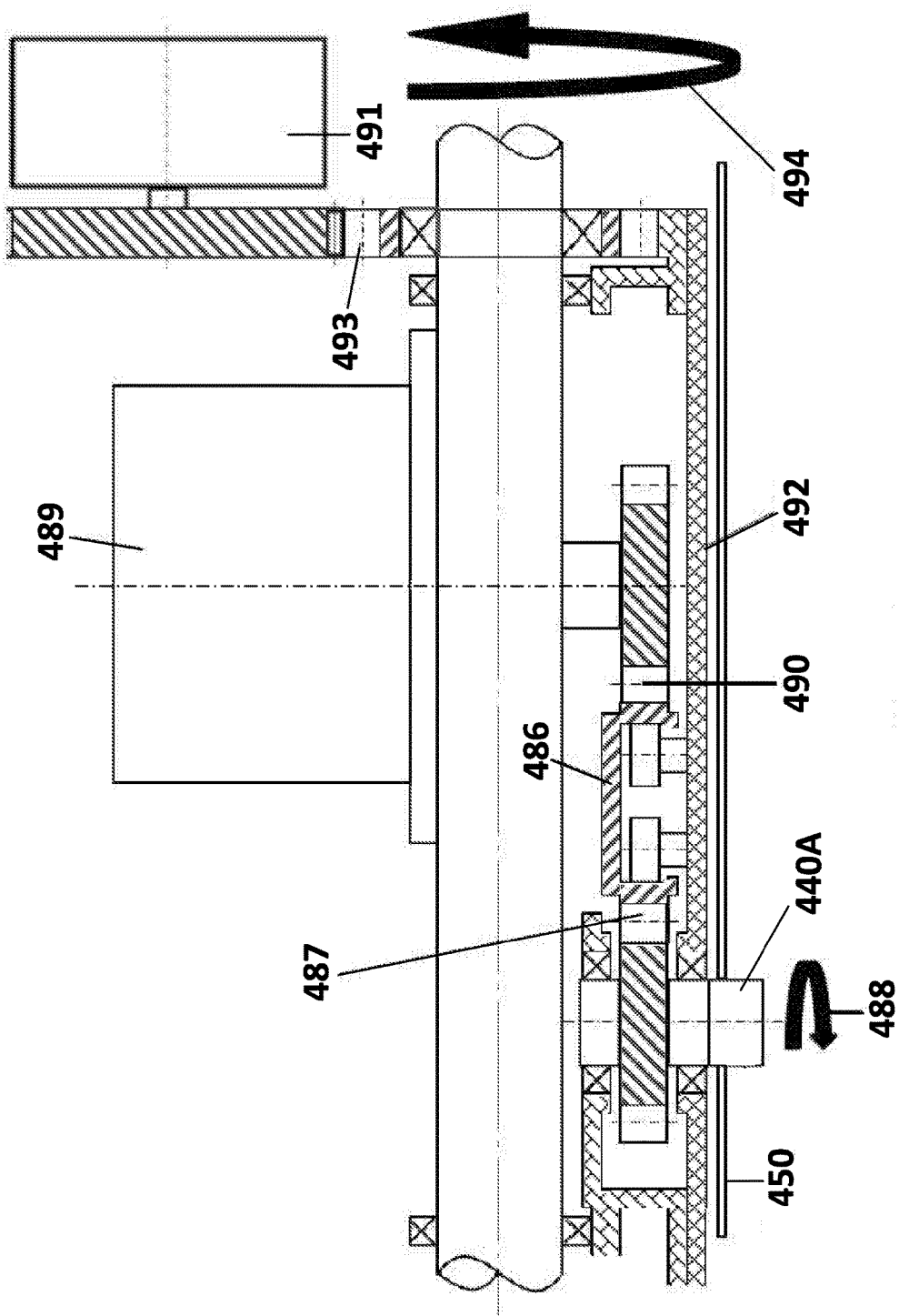

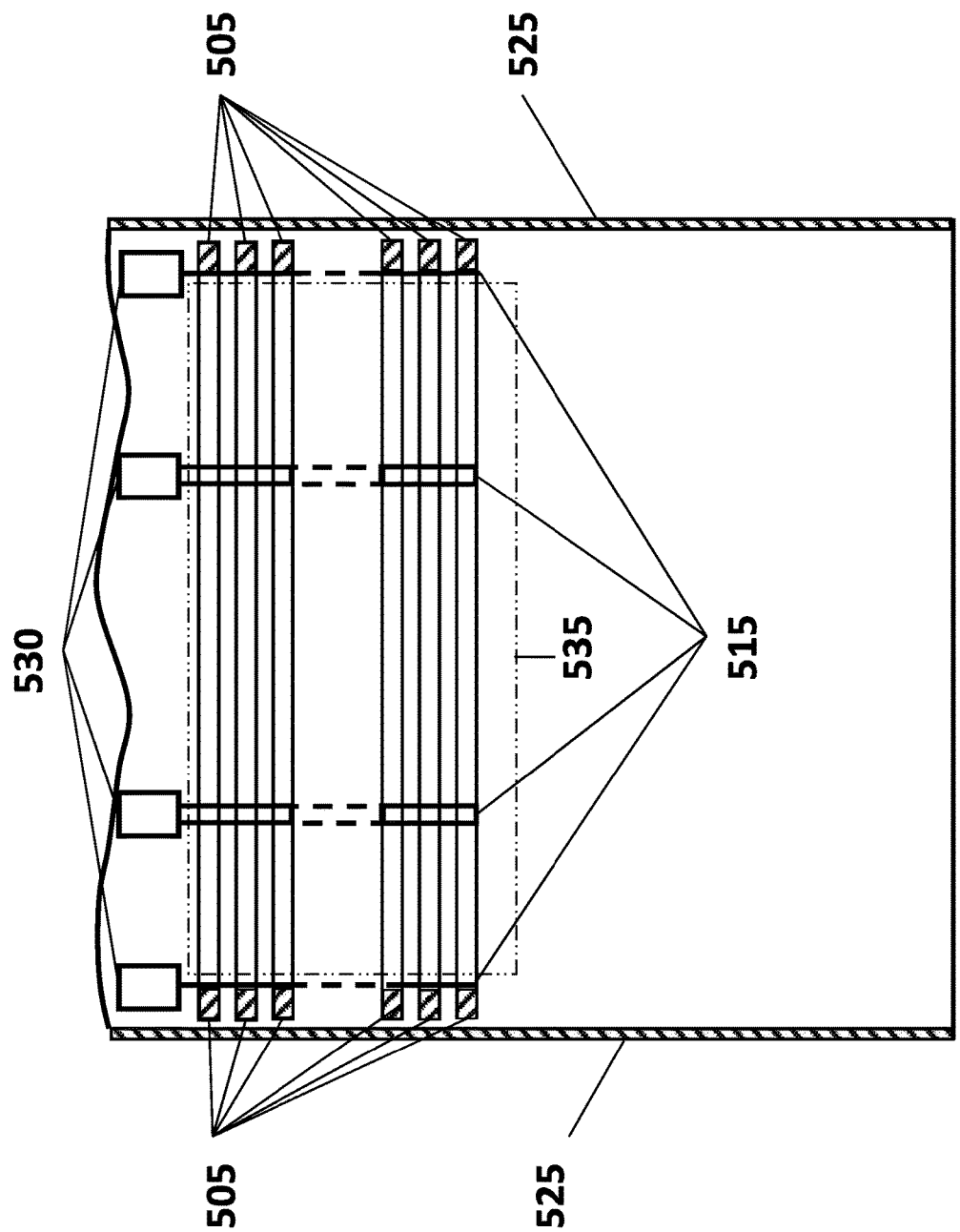

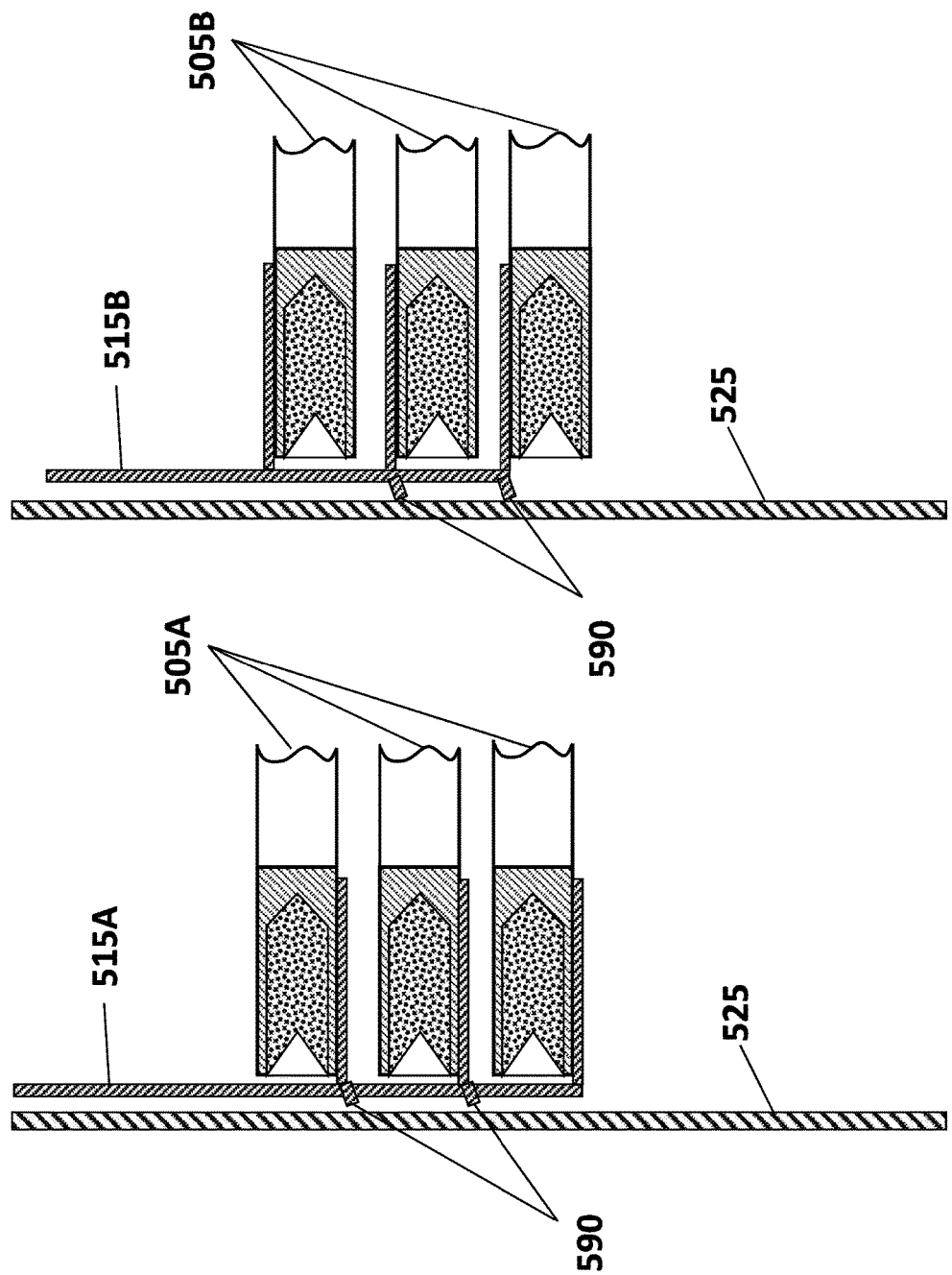

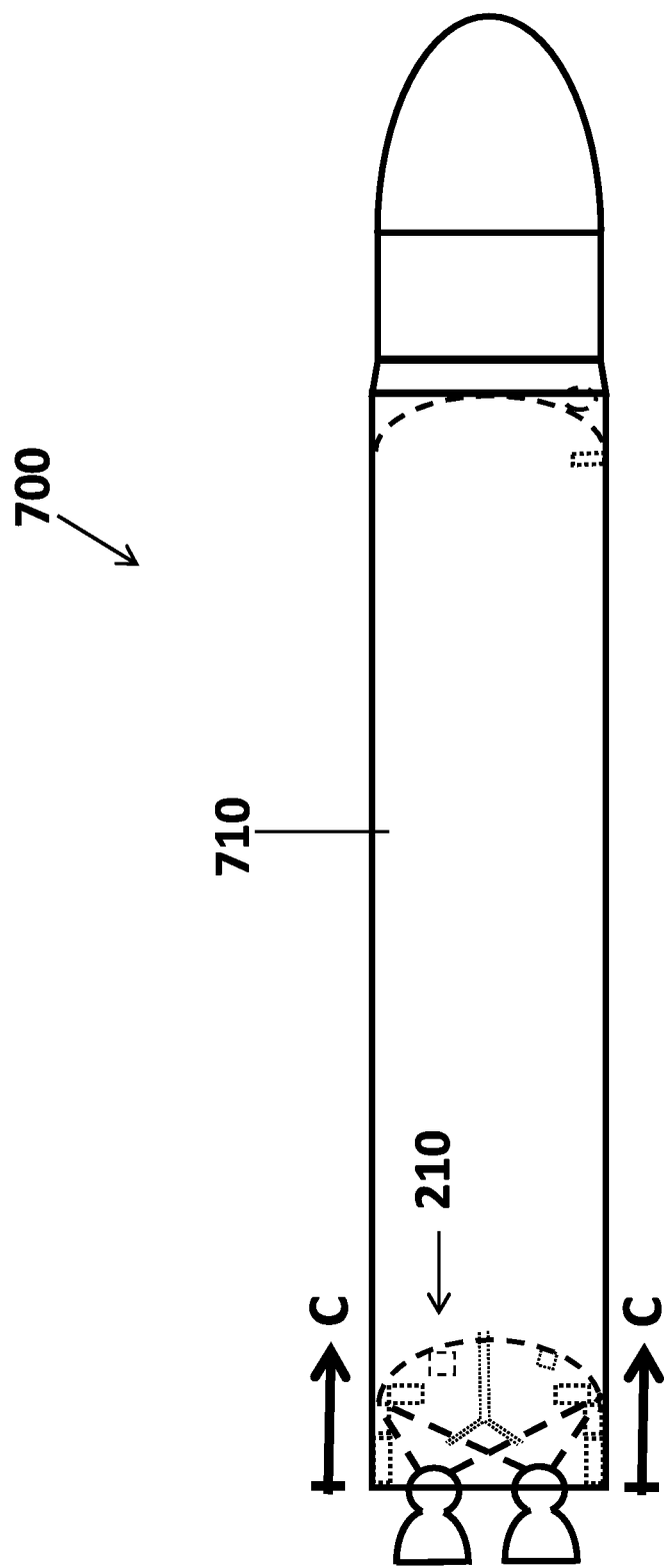

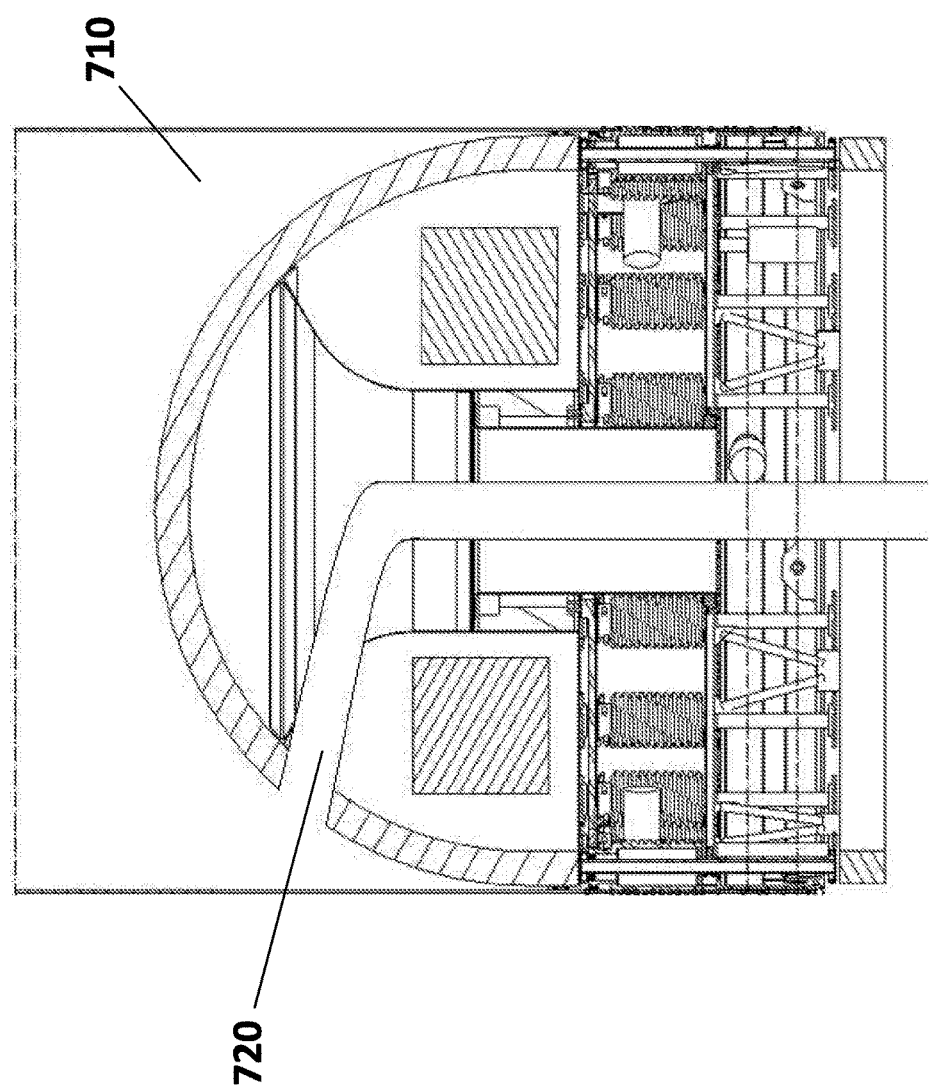

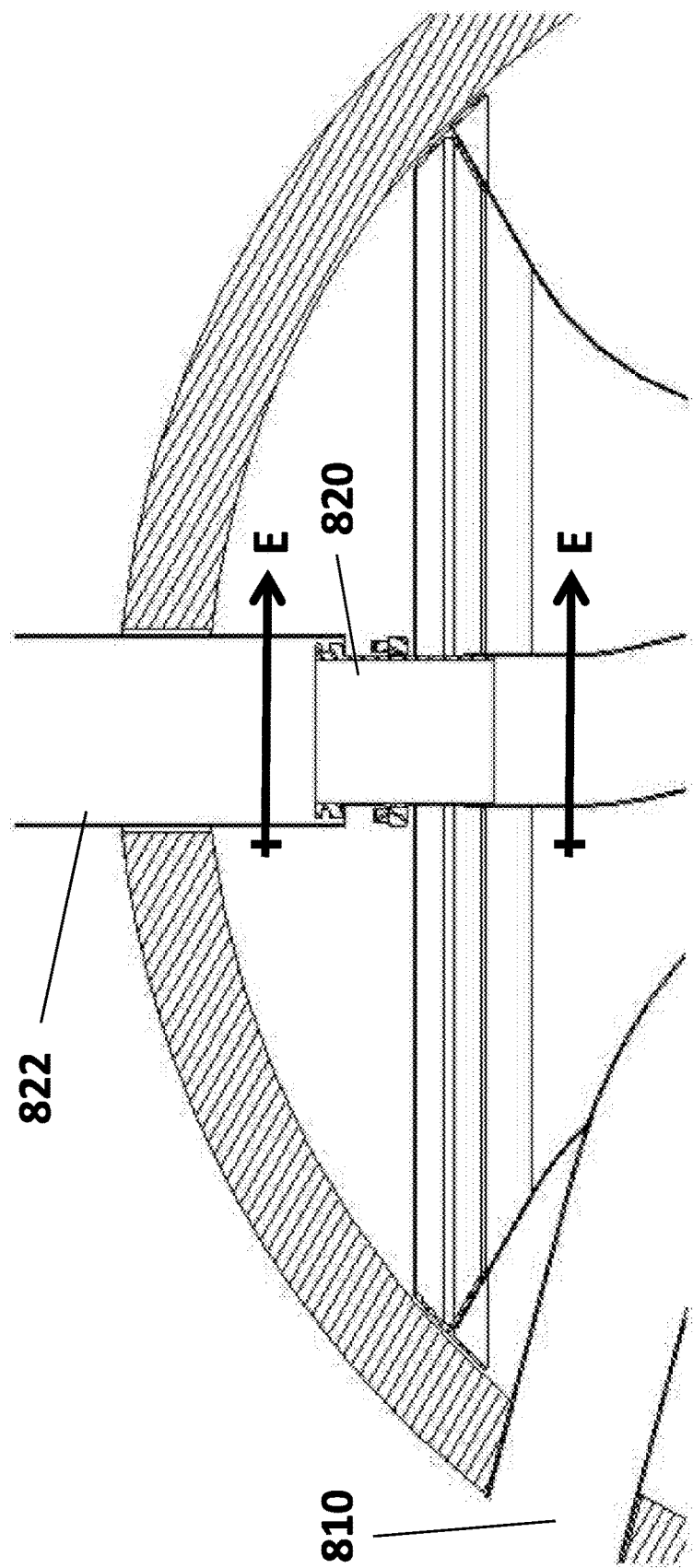

LAUNCHER REDUNDANT TANK MASS SHEDDING SYSTEM

FIELD OF THE INVENTION

The present invention generally relates to a propulsion system for rockets and specifically to a method of continuously reducing the weight of a launcher during its ascent.

CROSS-REFERENCE TO RELATED PATENT APPLICATIONS

This patent application claims priority from and is related to Israeli Patent Application Serial Number 236287, filed 15 Dec. 2014, this Israeli Patent Application incorporated by reference in its entirety herein.

BACKGROUND

From the early days of theorizing about multi-stage rockets, it has been realized that the best performance could be achieved by taking the concept to its limit—a continuous process of discarding empty portions of the fuel tanks. Several patents have been issued in this field, both for solid fuel, monopropellant and bi-propellant liquid fuel, but none has been applied to a production launcher. The conventional practice is to build a launcher from several stages, positioned one on top of the other, and to drop them off one by one once the propellant is exhausted in each one.

Prior art proposed various methods of reducing the weight of a rocket fuel tank during launch as a continuous process, as opposed to the above mentioned method of dropping off complete stages once their fuel is exhausted.

The method of achieving a continuous discarding of empty tank portions involves two basic issues:
1. Moving the bottom of the tank, carrying the combustion chamber and nozzle (hereafter called "piston"), up inside the outer tank wall to the top of the tank, as the fuel is consumed.
2. Discarding the redundant tank wall of the tank that extends aft of said moving piston.

Regarding the first requirement of propelling the piston up, prior art has proposed either internal or external means, extending the whole length of the tank, for pulling the piston up to the top of the tank.

U.S. Pat. No. 4,703,694 proposes as one option a rack and pinion mechanism, with the rack extending internally the whole length of the tank. Another option proposes an internal cable for pulling the piston up.

U.S. Pat. No. 3,043,221 proposes tension members—very long springs or rubber cords—extending the whole length of the tank internally.

U.S. Pat. No. 3,067,575 proposes an internal cable pulling the piston up.

U.S. Pat. No. 3,127,739 proposes either an internal screw jack, an internal ratcheted rod, or an external system of racks and pinion. All these elements extend the whole length of the tank.

U.S. Pat. No. 7,210,282 proposes several external screw jacks, extending the whole length of the tank Such piston moving elements have various drawbacks. Since the fuel tank is long, as it is in typical launchers, the weight of a rack, a ratcheted rod or a screw jack, probably made of steel, will be high. If it is internal to the tank, it will have to be compatible with the fuel, and good sealing will be required top and bottom, where it passes through the structure. An external system will be even heavier, since at least two pulling elements will be required. For example, a steel screw jack with a two inch diameter, running the length of a twenty meter tank, weighs over two hundred Kg.

There is also the problem of cutting said rod/rack/screw jack as it extends below the piston, in order to get rid of its weight.

U.S. Pat. No. 3,250,216 proposes a combustion chamber and nozzle for a solid rocket motor, where the combustion chamber is pushed up along the fuel tank by the thrust alone, with no control over its speed.

German Pat. No. DE102010011553 B4 also proposes that the thrust of the rocket motor is the only motive force for pushing the pistons up, without any control system.

Such a system may be good for a solid rocket motor, but for liquid/gel propellant, control is required over the pressure in the tank and therefore some motion control mechanism is needed.

Regarding the second issue, getting rid of the empty portions of the fuel tank, extending below the piston, all prior art proposed to dispose of the structure by burning it, either inside the rocket engine itself, or by the hot plume of the engine(s).

U.S. Pat. No. 4,703,694 proposes to burn the empty skin by the plume of the rocket motors, but in order to use the redundant skin as fuel for added thrust, a ram-rocket element is added, which also adds to the weight and complexity of the launcher.

U.S. Pat. No. 3,043,221 & U.S. Pat. No. 3,067,575 also proposes to burn the empty skin by the plume of the rocket motors.

U.S. Pat. No. 3,127,739 proposes a different method, according to which the structure of the tanks is fed directly into the special combustion chamber, and burns there together with a special solid fuel, carried specifically for this purpose. In another embodiment of said patent a more conventional combustion chamber is shown, but it still has to burn the tank structure, which is continually inserted into it.

U.S. Pat. No. 7,210,282 proposes pulling the rocket case into the combustion chamber for burning. An elaborate sealing system is required to prevent hot gas escape around the entrance to the combustion chamber.

German Pat. No. DE102010011553 B4 proposes that the redundant skin protruding below the rocket motor will be burned off, presumably by the rocket plume, but no details are given.

U.S. Pat. No. 3,308,624 is perhaps the most complex in this regard, as it proposes to mechanically grind the case to chips before burning them to provide thrust. A great amount of energy is required for this operation, which in turn requires special turbines to provide the power.

Another proposal (U.S. Pat. No. 4,723,736) involves installing several sub-stages of oxidizer tanks one above the other, forming the fuel tank by their inner surfaces. A piston carrying the rocket motor moves up inside the fuel tank as the fuel is consumed. The sub-stages are discarded once the oxidizer inside them is consumed, and the piston has moved to the higher sub-stage. A complex construction is required, and a system of tubes, valves and separation devices. The sealing between the sections, which is critical to create an internal fuel tank, is difficult to achieve.

There are several disadvantages to all those patented methods:
1. The structure must be made from a material that will burn easily, yet be safe for use, and will not burn ahead of the desired location. In the case of a solid fuel motor, the rate of case burning must match the rate of fuel burning, in order to keep the combustion chamber at a constant volume.
2. Some have suggested a composite structure in order to facilitate burning, but this may produce toxic gasses, which may not be acceptable.
3. Burning of the case inside the rocket engine, such as proposed by U.S. Pat. No. 3,127,739, means that a special rocket engine must be developed, instead of using an existing engine. An engine that must burn metal or composite materials may be difficult to develop, and in any case this will require investment of money and time in order to ensure steady and reliable burning.
4. Burning the case by the exhaust plume may have an effect on the propulsion of the launcher. An attempt to increase thrust by using the case as a fuel, such as proposed by U.S. Pat. No. 4,703,694, also requires a development of a special engine system.
5. The proposal involving sub-stages of oxidizer tanks is very complicated, requiring a system of tubes and valves, many tanks with their attachment and ejection elements, and more skin area than in conventional tanks, increasing weight.

SUMMARY

According to a first aspect of the present invention there is provided a system for shedding redundant launcher tank mass, comprising progressing means, and cutting means configured to cut redundant propellant tank wall, said system configured to progress inside said tank, along said tank wall in an initially predetermined rate.

The system may further comprise a piston; an energy source; and piston sealing means configured to seal the space between said piston and said propellant tank wall; wherein said progressing means comprise: a plurality of piston propelling worms (PPWs), each worm comprising at least one PPW groove cutter and configured to rotate around an individual PPW shaft via an individual PPW gearing; a progression cogwheel connected with each of said individual PPW gearings; and a ring shaped motor connected with said progression cogwheel and configured to rotate said progression cogwheel which rotates each of said individual PPW gearings; said energy source configured to provide energy to said ring shaped motor.

The system may further comprise a piston; an energy source; and piston sealing means configured to seal the space between said piston and said propellant tank wall; wherein said progressing means comprise: a plurality of piston propelling worms (PPWs), each worm comprising at least one PPW groove cutter and configured to rotate around an individual PPW shaft via an individual PPW gearing; a corona connected with said plurality of individual PPW gearings; and at least one progression motor, each motor connected with one of said individual PPW gearings and configured to rotate said connected individual PPW gearing which rotates said corona; said energy source configured to provide energy to said at least one progression motor.

The cutting means may comprise vertical and circumferential cutting means.

The cutting means may comprise mechanical cutting means.

The mechanical cutting means may comprise one of endmill and cutter.

The cutting means may comprise one of laser cutting means and shaped charge cutting rings.

The shaped charge cutting rings may be hanged by one of straps connected to said rings upper side and straps connected to said rings lower side.

The shaped charge cutting rings may comprise a protective shield configured to protect each ring from an explosion of another ring.

The energy source may comprise at least one battery.

The at least one battery may comprise one of dry battery and thermal battery.

The energy source may comprise a turbo generator.

The turbo generator may comprise one of a compressed gas powered generator and a fuel powered generator.

The energy source may comprise one of a launcher engine's own electrical generation system and super capacitors.

The system may further comprise: a propellant duct milling head configured to mill a propellant duct; and a milling motor configured to rotate said propellant duct milling head, said motor energized by said energy source.

The system may further comprise: a pressure sensor configured to measure the pressure in the propellant tank; and a motion control system configured to modify said progression rate.

The system may further be configured to progress along said tank wall in a variable rate dependent on said pressure in the propellant tank.

The system may further comprise shaft supports.

A monopropellant launcher may comprise the system.

According to a second aspect of the present invention there is provided a bipropellant launcher comprising two systems for shedding redundant launcher tank mass: a first system mounted in an upper propellant tank and comprising progressing means, and cutting means configured to cut redundant propellant tank wall, said system configured to progress inside said upper tank, along said upper tank wall in an initially predetermined rate; and a second system mounted in a lower propellant tank, said second system comprising: progressing means, and cutting means configured to cut redundant propellant tank wall, said system configured to progress inside said lower propellant tank, along said lower tank wall in an initially predetermined rate; and a propellant duct milling head configured to mill a propellant duct which is part of a propellant duct assembly connecting the upper propellant tank and at least one launcher motor.

The propellant duct assembly may comprise a propellant duct, a movable end and duct sealing means that may be configured to seal the space between said propellant duct and said movable end.

According to a third aspect of the present invention there is provided a method of cutting redundant propellant tank wall, comprising: providing a system for shedding redundant launcher tank mass, comprising progressing means, and cutting means configured to cut redundant propellant tank wall, said system configured to progress inside said tank, along said tank wall in an initially predetermined rate; starting the system's progression according to said predetermined rate; and cutting said redundant propellant tank wall.

The cutting means may comprise vertical and circumferential cutting means.

The cutting means may comprise mechanical cutting means.

The mechanical cutting means may comprise one of endmill and cutter.

The cutting means may comprise one of laser cutting means and shaped charge cutting rings.

The shaped charge cutting rings may be hanged by straps connected to said rings upper side.

The shaped charge cutting rings may be hanged by straps connected to said rings lower side.

Each one of said shaped charge cutting rings may comprise a protective shield that may be configured to protect each ring from an explosion of another ring.

The method may further comprise: providing a propellant duct milling head configured to mill a propellant duct; and a milling motor configured to rotate said propellant duct milling head, said motor energized by said energy source; and milling said propellant duct.

The method may further comprise: providing a pressure sensor; providing a motion control system; and measuring the pressure inside said propellant tank.

The method may further comprise modifying said rate according to said measured pressure inside the propellant tank.

According to a fourth aspect of the present invention there is provided a system for shedding redundant launcher tank mass, comprising a first sub-system comprising: progressing means; and cutting means configured to cut redundant propellant tank wall; and a second sub-system configured to divide said propellant tank; said first and second sub-systems are connected to each other via a dual duct; said first sub-system is configured to progress inside said tank, along said tank wall in initially predetermined first progression rate; and said second sub-system is configured to progress inside said tank, along said tank wall in initially predetermined second progression rate.

The first sub-system may further comprise: a piston mounted inside the lower side of said propellant tank; an energy source; piston sealing means configured to seal the space between said piston and said propellant tank wall; a dual duct milling head; a milling motor; a plurality of duct propelling worms (DPWs), each worm comprising at least one individual DPW groove cutter and configured to rotate around an individual DPW shaft via an individual DPW gearing; a duct cogwheel connected with each of said individual DPW gearings; and a duct motor connected with said duct cogwheel and configured to rotate said duct cogwheel which rotates each of said individual DPW gearings; wherein said progressing means comprise: a plurality of piston propelling worms (PPWs), each worm comprising at least one individual PPW groove cutter and configured to rotate around an individual PPW shaft via an individual PPW gearing; a progression cogwheel connected with each of said individual PPW gearings; and a ring shaped motor connected with said progression cogwheel and configured to rotate said progression cogwheel which rotates each of said individual PPW gearings; wherein said second sub-system may further comprise: a middle piston mounted inside said propellant tank; middle piston sealing means configured to seal the space between said middle piston and said propellant tank wall; a cleaning system mounted in said middle piston; and a gas tank mounted in said middle piston and configured to provide gas to said cleaning system; wherein said dual duct comprises a propellant duct which is part of a propellant duct assembly connecting the upper side of said propellant tank and at least one launcher motor; said dual duct milling head configured to mill said dual duct comprising said propellant duct; said milling motor configured to rotate said dual duct milling head; and said energy source configured to provide energy to said ring shaped motor, said duct motor and said milling motor.

The duct motor and said milling motor may be the same motor.

The duct motor may be a ring shaped motor.

The energy source may comprise at least one battery.

The at least one battery may comprise one of dry battery and thermal battery.

The energy source may comprise a turbo generator.

The turbo generator may comprise one of a compressed gas powered generator and a fuel powered generator.

The energy source may comprise one of a launcher engine's own electrical generation system and super capacitors.

The system may further comprise: an upper pressure sensor configured to measure the pressure in an upper side of said propellant tank; a lower pressure sensor configured to measure the pressure in a lower side of said propellant tank; and a motion control system configured to modify said first and second progression rates.

The system may further be configured to progress along said tank wall in variable rates dependent on said pressures in said propellant tank.

The system may further comprise shaft supports.

The propellant duct assembly may comprise a propellant duct, a movable end and duct sealing means configured to seal the space between said propellant duct and said movable end.

A bipropellant launcher may comprise the system.

The first sub-system may further comprise: a piston mounted inside the lower side of said propellant tank; an energy source; piston sealing means configured to seal the space between said piston and said propellant tank wall; a dual duct milling head; a milling motor; a plurality of duct propelling worms (DPWs), each worm comprising at least one individual DPW groove cutter and configured to rotate around an individual DPW shaft via an individual DPW gearing; a duct cogwheel connected with each of said individual DPW gearings; and a duct motor connected with said duct cogwheel and configured to rotate said duct cogwheel which rotates each of said individual DPW gearings; wherein said progression means comprise: a plurality of piston propelling worms (PPWs), each worm comprising at least one individual PPW groove cutter and configured to rotate around an individual PPW shaft via an individual PPW gearing; a corona connected with said plurality of individual PPW gearings; at least one progression motor, each motor connected with one of said individual PPW gearings and configured to rotate said connected individual PPW gearing which rotates said corona; wherein said second sub-system further comprises: a middle piston mounted inside said propellant tank; middle piston sealing means configured to seal the space between said middle piston and said propellant tank wall; a cleaning system mounted in said middle piston; a gas tank mounted in said middle piston and configured to provide gas to said cleaning system; and wherein said dual duct comprises a propellant duct which is part of a propellant duct assembly connecting the upper side of said propellant tank and at least one launcher engine; said dual duct milling head configured to mill said dual duct comprising said propellant duct; said milling motor configured to rotate said dual duct milling head; and said energy source configured to provide energy to said at least one progression motor, said duct motor and said milling motor.

According to a fifth aspect of the present invention there is provided a method of cutting redundant propellant tank wall, comprising: providing a system for shedding redundant launcher tank mass, comprising a first sub-system comprising: progressing means; and cutting means configured to cut redundant propellant tank wall; and a second sub-system configured to divide said propellant tank; said first and second sub-systems are connected to each other via a dual duct; said first sub-system is configured to progress inside said tank, along said tank wall in initially predetermined first progression rate; and said second sub-system is configured to progress inside said tank, along said tank wall in initially predetermined second progression rate; starting the system's progression according to said predetermined first and second progression rates; and cutting said redundant propellant tank wall.

The method may further comprise: providing an upper pressure sensor and a lower pressure sensor; providing a motion control system; and measuring the pressures in both sides of said propellant tank.

The method may further comprise modifying said first and second progression rates according to said measured pressures in both sides of said propellant tank.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1A is a schematic drawing of an example of existing multi-stage launcher;

FIG. 1B demonstrates the multi-stage launcher of FIG. 1A after the inter stage structure and the first stage parts were shed;

FIG. 2A demonstrates the installation of two RTMSS in bipropellant launcher;

FIG. 2B demonstrates the installation of a RTMSS in a monopropellant launcher;

FIG. 4A is a schematic view of section A1-A1 of FIG. 3A;

FIG. 4B is an enlargement of detail 444 of FIG. 4A;

FIG. 4C demonstrates the redundant tank wall circumferential cutting process by an endmill according to embodiments of the present invention;

FIG. 5A is a side view of the shaped charge rings;

FIG. 5C demonstrates the straps that hold each ring;

FIG. 5D demonstrates another embodiment of the straps that hold each ring;

FIG. 7 demonstrates a monopropellant launcher with the present invention's RTMSS;

FIG. 7A is a schematic view of section C-C of FIG. 7;

FIG. 8A is a schematic view of section D-D of FIG. 8;

DETAILED DESCRIPTION OF PREFERRED EMBODIMENTS

Figure 3A:
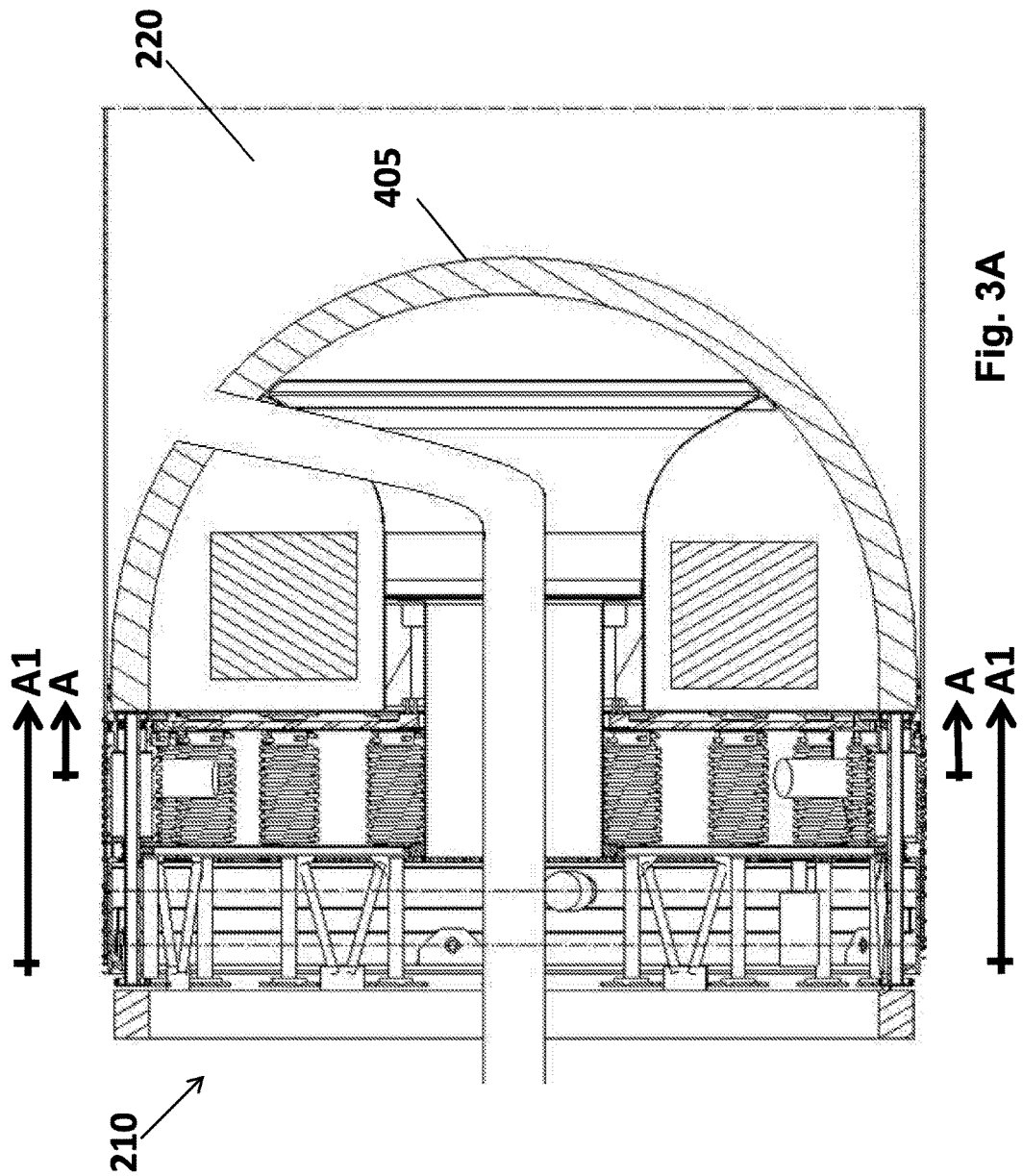
FIG. 3A is a schematic view of the present invention's RTMSS according to embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Launching payloads to earth orbit requires a very large amount of energy; therefore it is vital to keep the mass of the launch vehicle to the minimum at all times during the ascent. The purpose of the present invention is to devise a system that continuously sheds tank mass as it becomes empty of propellant. The purpose is accomplished by making the bottom of the tank, with the rocket engine attached below, as a moving piston that can move up inside the tank barrel. That piston is propelled up at a predetermined rate or at a controlled rate, dictated by the consumption of the propellant. As the piston moves along the tank, the redundant portions of the tank's wall are cut off and dropped overboard, thus reducing the mass of the launcher at a faster rate than common in existing launchers today but without discarding the launcher's engine(s), which works continuously till the end of the boost phase.

FIG. 1A is a schematic drawing of an exemplary existing multi-stage launcher 100. In this launcher type, the orbital velocity is achieved in two stages. More than two stages may be employed, but for illustrating the principle, two stages are shown. In the first stage, the launcher uses the first stage engine(s) 110 up to a point that the first stage propellant tanks (fuel and oxidizer) 120 and 121 are exhausted. In the second stage, the separation system 145 separates the inter stage structure 135 and the first stage parts 130, the parts are shed and the second stage engine(s) 140 continues the ascent, using the second stage propellant tanks 150 and 151.

The launcher also comprises a first stage pressurizing system 125, avionics 155, a second stage pressurizing system 160 and a payload 170.

FIG. 1B demonstrates the multi-stage launcher of FIG. 1A after the inter stage structure and the first stage parts were shed.

The present invention aims to provide a Redundant Tank Mass Shedding System (RTMSS) that eliminates the need for two separate stages, namely, two separate engine systems and the loss of one of them, improves the performance of the launcher and may allow an SSTO (Single Stage To Orbit).

FIGS. 2A and 2B demonstrate two types of launchers that the present invention's RTMSS may be installed in, a bipropellant launcher (2A) and a monopropellant launcher (2B).

FIG. 2A demonstrates the installation of two RTMSS 210 in bipropellant launcher 200, mounted one at the engine end 205 and the other between the propellant tanks (for example, fuel and oxidizer) 220 and 230.

FIG. 2B demonstrates the installation of a RTMSS 210 in a monopropellant launcher 250, mounted at the engine end 260 of propellant tank 240.

FIG. 3A is a schematic view of the present invention's RTMSS 210 mounted at the end of a propellant tank 220 according to embodiments of the present invention.

Figure 3B:
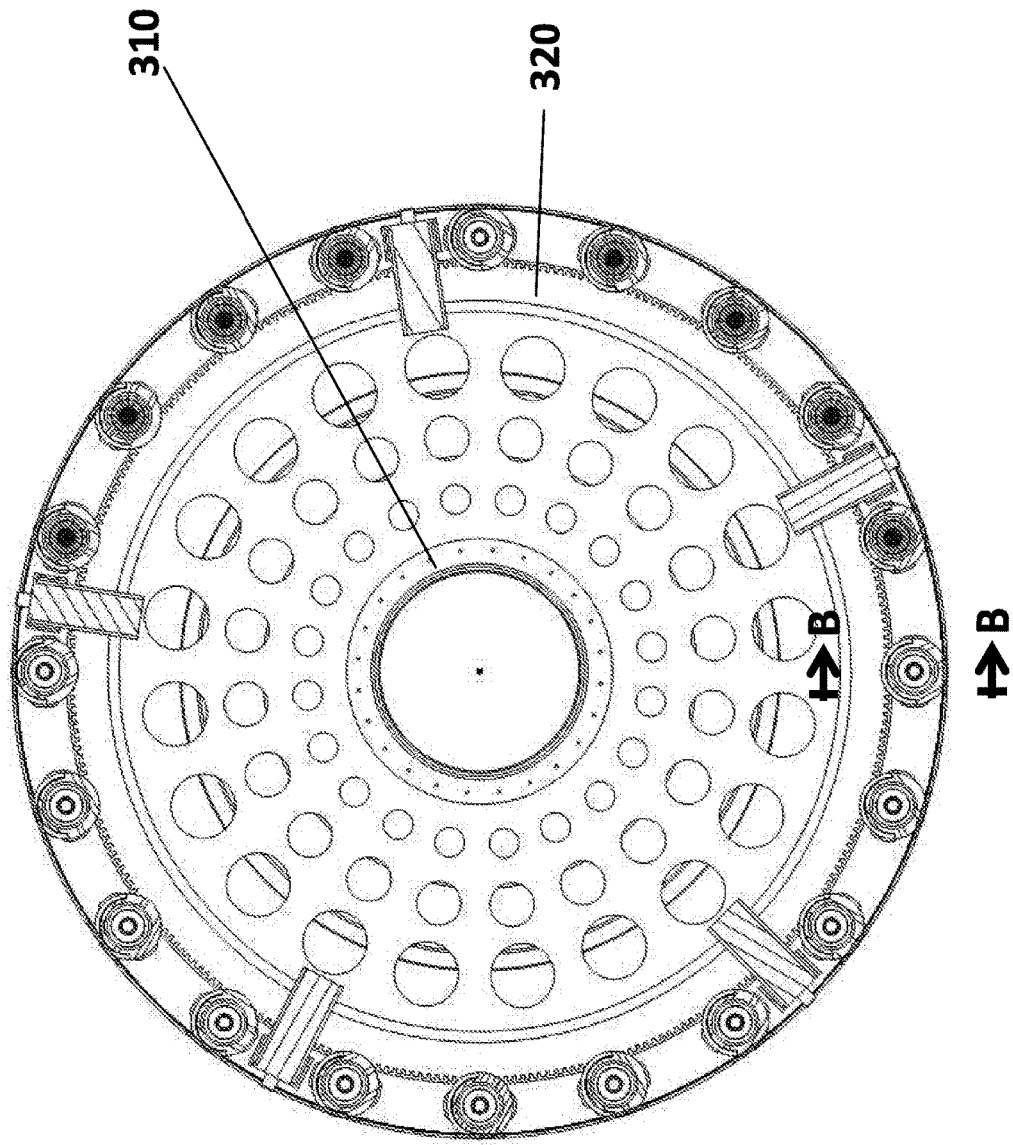
FIG. 3B is a schematic view of section A-A of FIG. 3A.

FIG. 3B is a schematic view of section A-A of FIG. 3A comprising a progression ring shaped motor 310 and a progression cogwheel 320 and will be described in detail in conjunction with FIG. 3C.

Figure 3C:
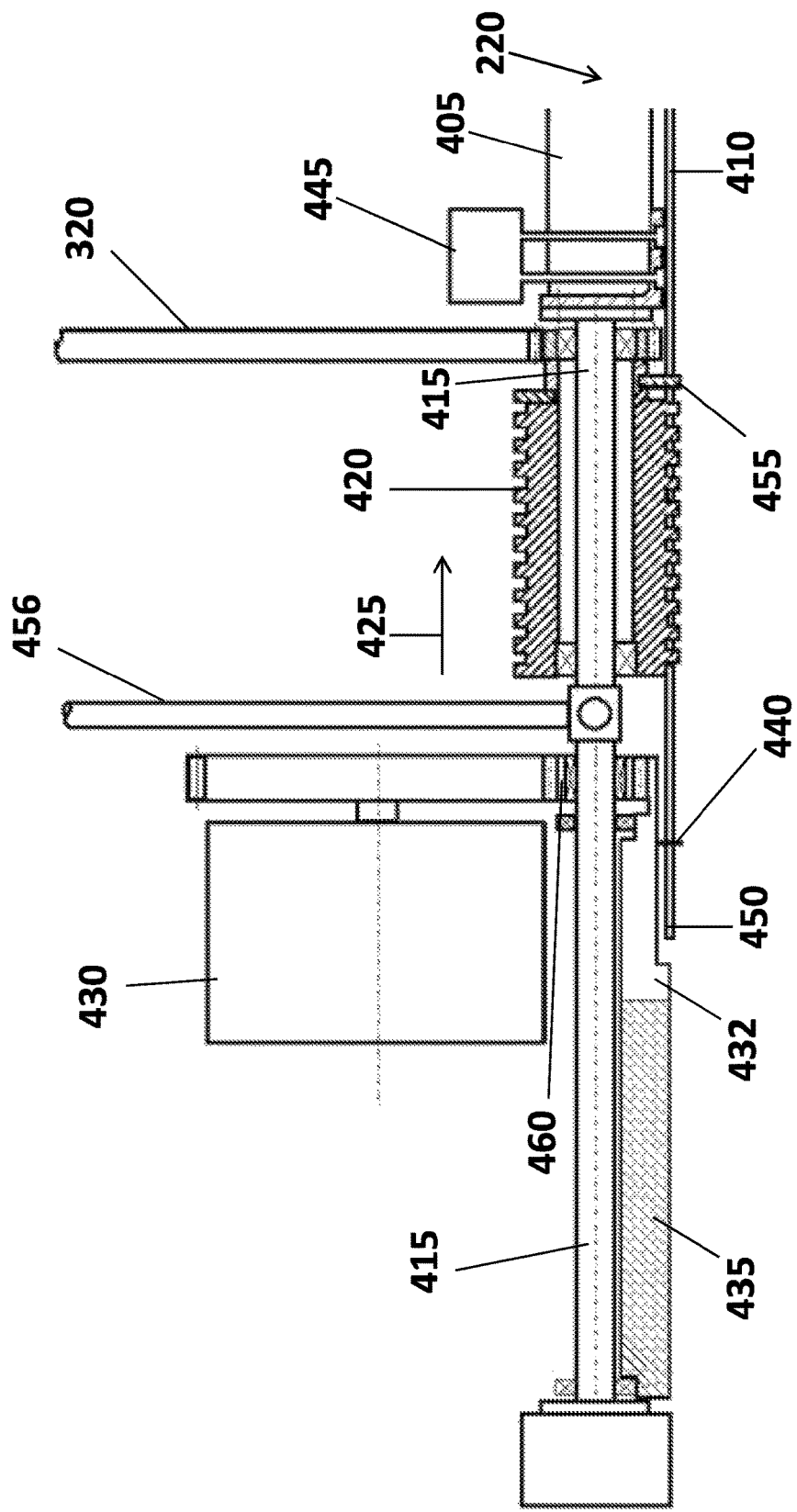
FIG. 3C is a schematic view of section B-B of FIG. 3B.

FIG. 3C is a schematic view of section B-B of FIG. 3B comprising a piston 405 that is mounted at the propellant tank 220 end, a propellant tank wall 410, a shaft 415, a piston propelling worm (PPW) 420 that rotates around the PPW shaft 415 and is configured to progress through the tank wall 410 in direction of arrow 425; a corona rotating motor 430, corona gearing 460, a corona 432, circumferential cutting means power supply 435, redundant tank wall circumferential cutting means 440, a piston propelling worm groove cutter 455, shaft support 456, a progression cogwheel 320 and a propellant tank dynamic sealing system 445 (piston sealing), such as inflatable sealing and the like.

The propellant tanks walls must be circular in shape, and smooth on the inside surfaces, in order to allow the RTMSS to move up inside the tank, and to allow sealing between the piston and the tank wall.

Each PPW 420 progresses in a groove made in the tank wall by at least one piston propelling worm groove cutter 455. As the PPW 420 progresses through the tank wall 410, a vertical cutting means (not shown) and the circumferential cutting means 440 cut the redundant tank wall 450 and shed it.

The circumferential cutting means 440 and the vertical cutting means (475 of FIG. 6A) may comprise laser cutting means, mechanical cutting means such as cutter, milling cutter such as endmill or any other cutting means known in the art and suitable for the task. In case that the cutting means are mechanical cutting means the circumferential cutting means power supply 435 may be replaced with a motor as will be explained in conjunction with FIG. 4A.

According to embodiments of the present invention, the PPW shaft 415 may be shorter and connected between the piston 405 and the shaft support 456, thus enabling to use a wider corona 432.

As mentioned above, according to embodiments of the present invention the circumferential cutting mean may be an endmill. FIG. 4A is a schematic view of section A1-A1 of FIG. 3A according to such embodiment, comprising: endmill 440A, progression cogwheel 320, shaft supports 456, a double side corona 486, PPWs 420, a double side corona rotating motor 489, a corona rotating motor 491 and gearing 490.

FIG. 4B is an enlargement of detail 444 of FIG. 4A.

FIG. 4C demonstrates the redundant tank wall circumferential cutting process by an endmill. In order to cut the redundant tank wall, the endmill 440A is rotated by a double side corona 486 via gearing 487 in the direction of arrow 488. The double side corona 486 is rotated by a double side corona rotating motor 489 via gearing 490. A corona rotating motor 491 rotates corona 492 via gearing 493. The corona 492 holds the endmill 440A and rotates with it in the direction of arrow 494, thus cutting the redundant tank wall 450 circumferentially. The vertical cutting mean that will be explained in FIGS. 6A-6C completes the redundant tank wall cutting process.

According to embodiments of the present invention, the endmill 440A may have an independent motor. For example, the motor may be mounted in ninety degrees to the endmill and may rotate it via suitable gearing 487. In such embodiment, the double side corona 486, the double side corona rotating motor 489 and the gearing 490 may be removed.

According to embodiments of the present invention, the redundant tank wall cutting may be done by shaped charge cutting rings containing linear shaped charge, located inboard of the tank wall and outboard of the launcher's motor(s). A number of rings hang one below the other, their number being as required for cutting the redundant tank wall to the optimal number of pieces for shedding. Spare rings may be added as a safety measure to compensate for misfire of some rings.

FIG. 5A is a side view of the shaped charge rings 505, hanged by straps 515 and configured to cut the redundant tank wall 525. The straps 515 are connected to the piston (not shown) via shock absorbing devices 530. The rings may also have an optional protective cylindrical shield 535 that is configured to protect the interior of the launcher from any debris of the shaped charges. The relative part of each ring's protective cylindrical shield may be shed along with its ring.

Figure 5B:
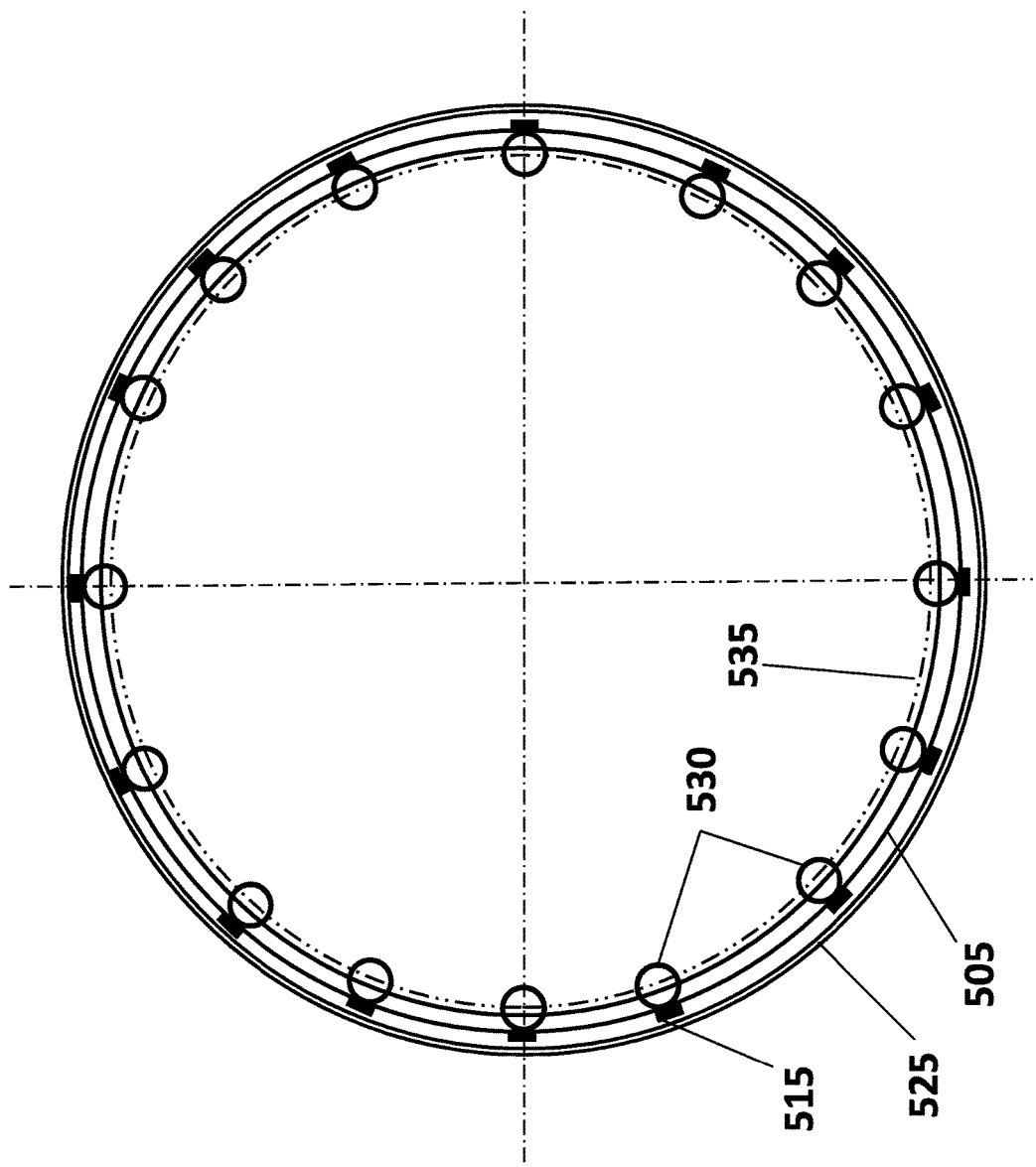
FIG. 5B is a top view of FIG. 5A.

FIG. 5B is a top view of FIG. 5A.

The rings hang by several metallic or non metallic straps, arranged around the perimeter of the tank wall 525. FIG. 5C demonstrates one of the straps 515A that holds each ring 505A and supports it at its bottom face. Each strap 515A has its vertical part pass between each ring and the tank wall 525, so the strap is cut by the explosion of the same shaped charge that cuts the section of the tank wall to be shed.

FIG. 5D demonstrates one of the straps 515B that holds each ring 505B and supports it at its upper face. Each strap 515B has its vertical part pass between each ring and the tank wall 525. In this arrangement the ring that has exploded remains hanging until the ring above it explodes.

Each ring may have a protective shield (590 of FIGS. 5C and 5D) extending below it, to prevent initiation of one ring by the explosion of the one below it.

The hanging of the rings by straps helps to attenuate the effect of the shock of the explosion on the launcher and the payload.

One advantage of this tank wall shedding method is the lack of mechanical or electrical system for cutting the tank wall, and the required energy source. The energy required for its actuation is negligible. Cost of development and purchase is reduced. Reliability is increased, and weight may be also reduced.

Another advantage of this tank wall shedding method is that the initiation of the shaped charges is by a control system that is mechanically independent of the motion system. The control system measures, for example, the length of the redundant tank wall, either directly, or by counting revolutions of any rotating part of the motion system, and uses that data for commanding initiation.

Another advantage of this tank wall shedding method is that instead of shedding sections of equal length, sections of different length may be shed, if it provides a better optimization of the launcher weight during its ascent. For example, calculations may show that soon after launch, when the launcher is still heavy, it is better to wait until a relatively longer section of tank wall may be cut, since the weight of the tank wall at that point is relatively small compared to the launcher. At a later time, when more fuel has been consumed and the launcher is lighter, it may be advantageous to shed smaller and smaller sections of tank wall, as their weight becomes a significant portion of the remaining weight of the launcher.

It will be pointed out that neither the exact design of the shaped charge nor the exact nature of the control system, or the protective shields, are a part of this invention, as they are well known technologies, and only their combination as described above is new.

Figure 6A:
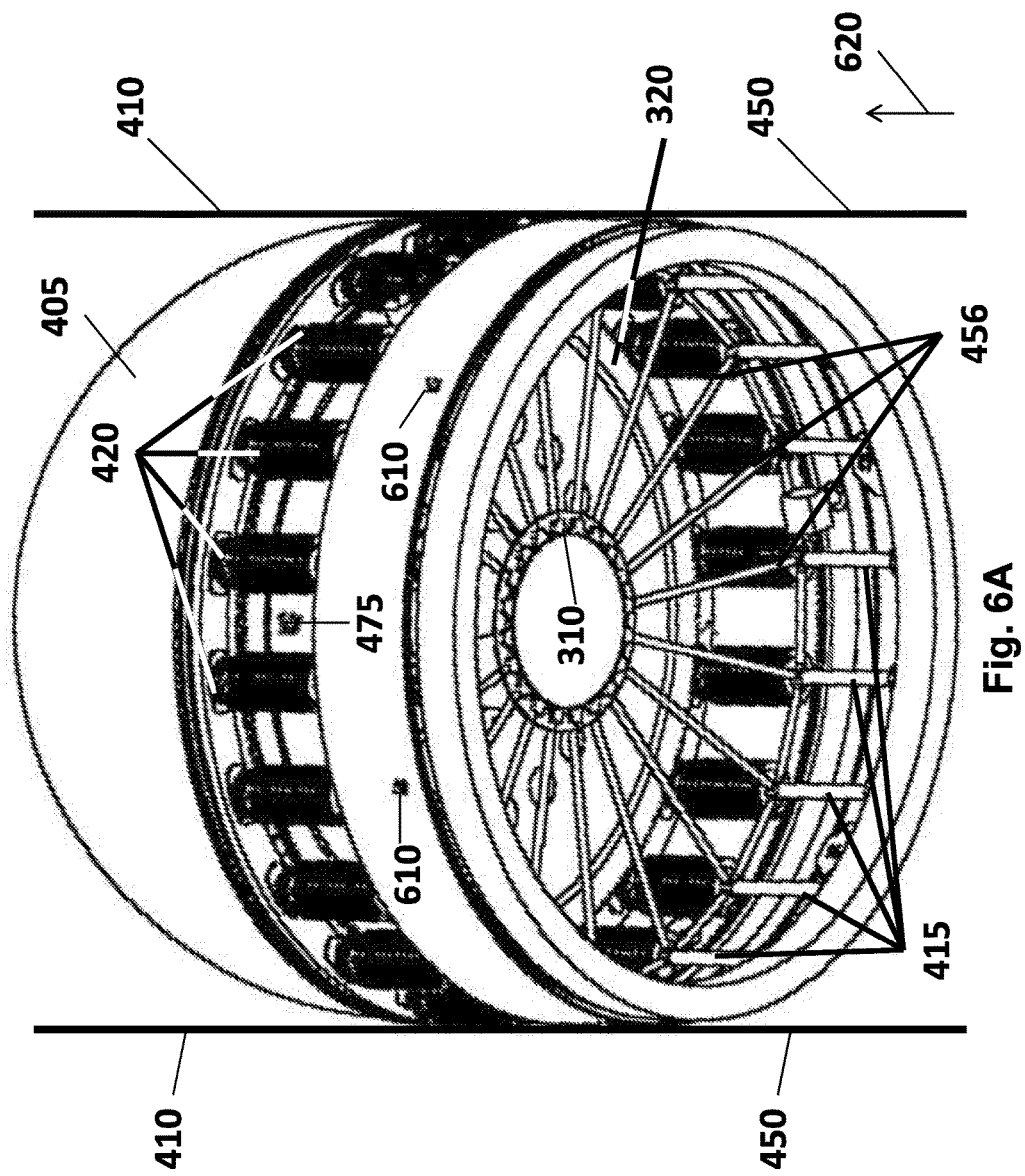
FIG. 6A demonstrates the operation of the RTMSS according to embodiments of the present invention.

FIG. 6A demonstrates the operation of the RTMSS 210. The progression ring shaped motor 310 rotates the progression cogwheel 320 that simultaneously rotates all the piston propelling worms (PPW) 420 in order to ensure equal rotation of each one of them. Each PPW comprises at least one PPW groove cutter 455 (not shown) which notches a groove in the tank wall 410 for the PPW 420 to screw in, in the direction of arrow 620. As the piston 405 is progressing, the redundant tank wall 450 is cut and shed by the circumferential cutting means 610 (440 or 440A) and the vertical cutting mean 475. The PPW shafts 415 may be supported by shaft supports 456 in order to prevent distortions and strengthen the structure.

The tank's wall thickness may locally increase circumferentially along the path of the PPWs' grooves, to provide proper load transfer between the PPWs and wall.

Figure 6B:
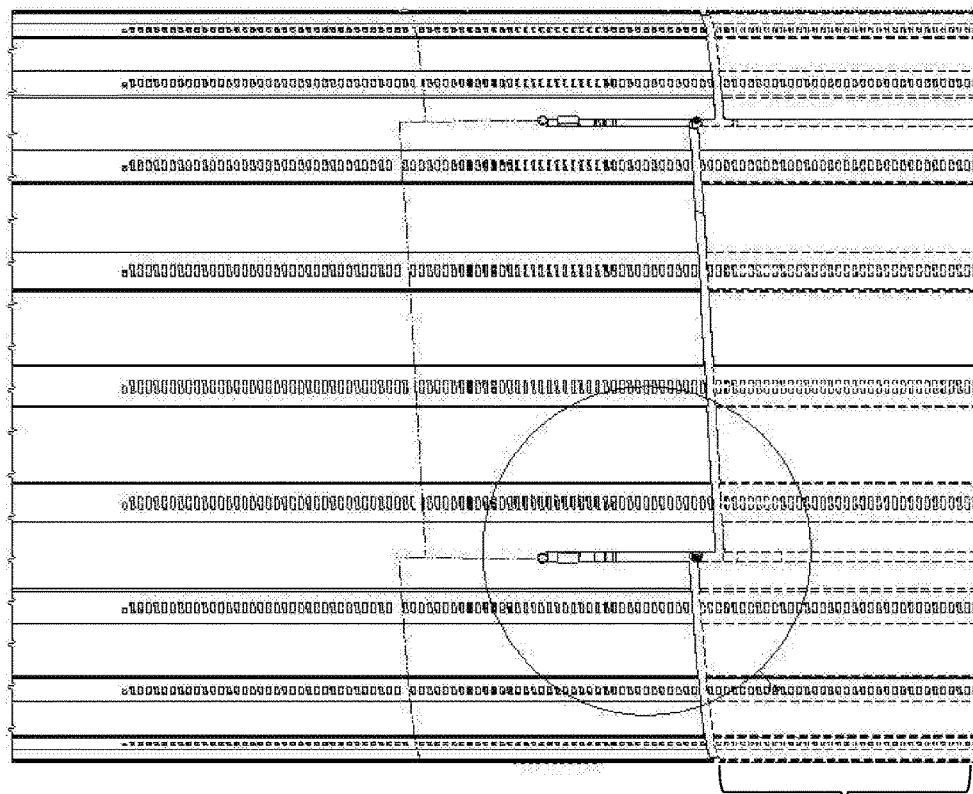
FIGS. 6B and 6C demonstrate the vertical and circumferential cutting process according to embodiments of the present invention.
Figure 6C:
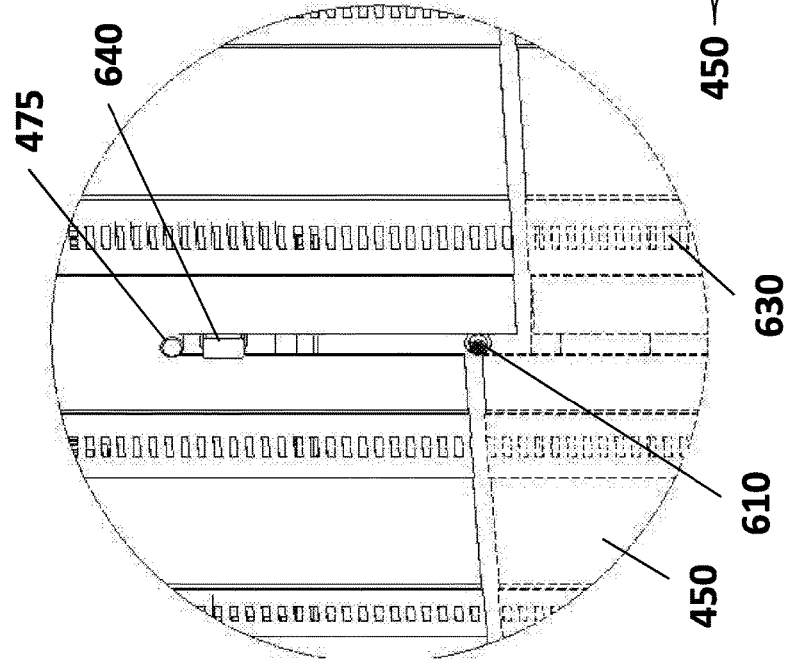

FIGS. 6B and 6C demonstrate the vertical and circumferential cutting process. As the piston propelling worms 420 (not shown) progress in the grooves 630, the vertical 475 and circumferential 610 (440 or 440A) cutting means cut the redundant tank wall. The vertical cutting process is continuous. The circumferential cutting process may be continuous or sequenced, according to predetermined program. If the circumferential cutting process is sequenced, the cutting means 610 must stop when they are aligned with the vertical slots made by the vertical cutting means. The circumferential cutting means then slide up freely through the vertical slots, which must be wider than the diameter of the circumferential cutting means, until the circumferential cutting is started again, in order to remove the next piece of redundant tank wall. Each vertical cutting mean 475 may be followed by a key 640 which is configured to prevent rotation of the RTMSS relative to the tank.

Figure 6D:
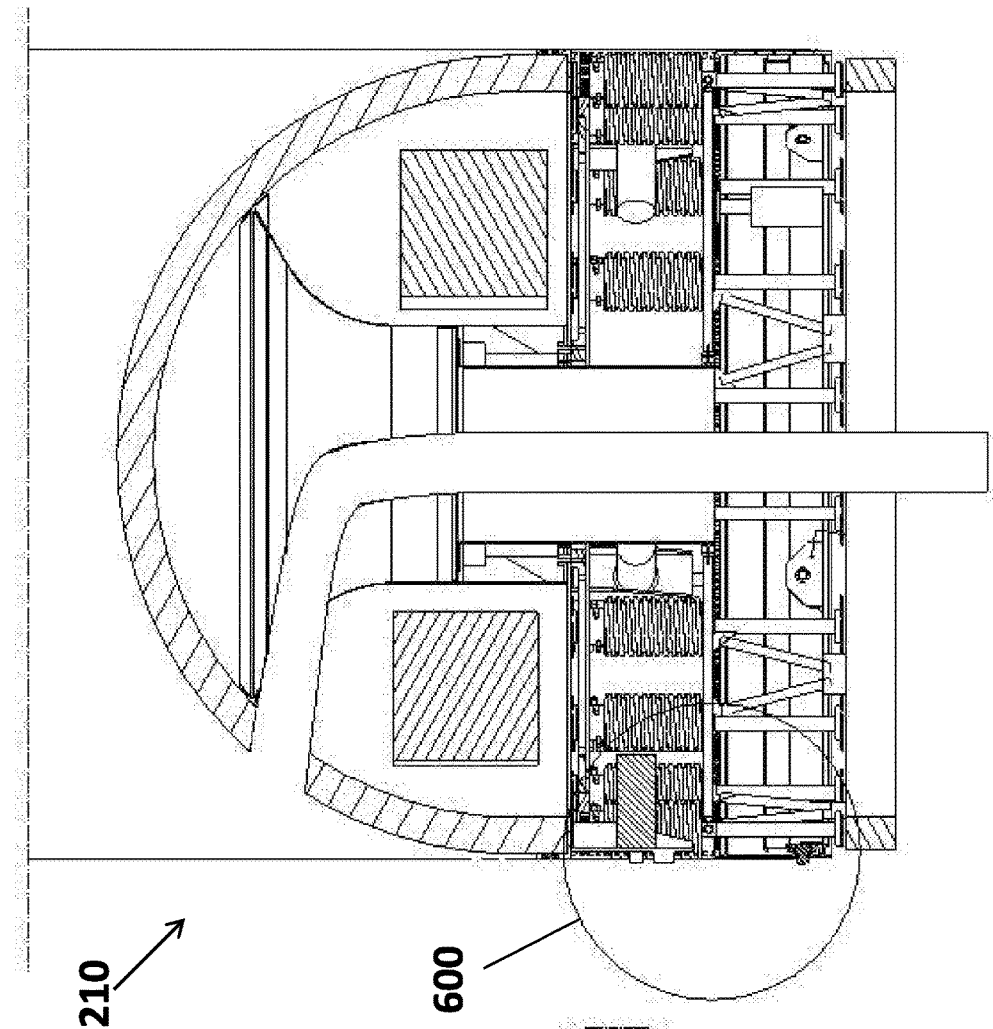
FIG. 6D is a longitudinal cross section of the present invention's RTMSS according to embodiments of the present invention.

FIG. 6D is a longitudinal cross section of the present invention's RTMSS 210.

Figure 6E:
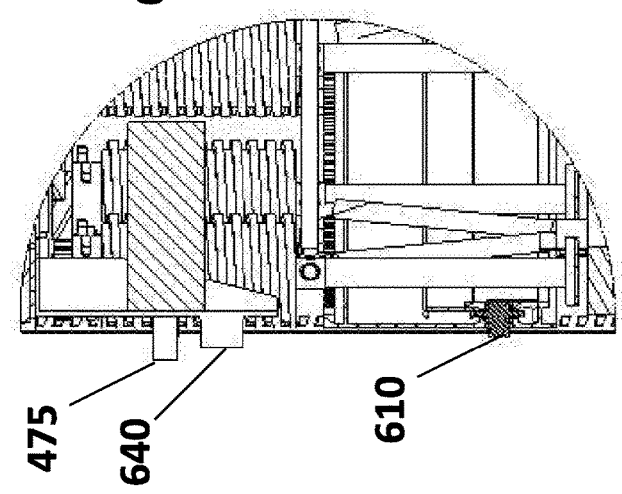
FIG. 6E is an enlargement of detail 600 of FIG. 6D.

FIG. 6E is an enlargement of detail 600 of FIG. 6D, comprising the vertical cutting means 475, the circumferential cutting means 610 (440 or 440A) and the key 640.

According to embodiments of the present invention, the progression ring shaped motor 310 may be replaced by a plurality of progression motors. There are two embodiments: in the first embodiment, each motor rotates a PPW gearing that rotates its PPW. The rotating gearing rotates a common corona that is mounted on the outer side of the PPWs and intermeshed with each PPW's gearing, thus ensuring equal rotation of each PPW.

In the second embodiment, the motors are mounted between the PPWs and rotate the common corona directly (with or without a gearing). The corona is mounted on the outer side of the PPWs and intermeshed with each PPW's gearing, thus ensuring equal rotation of each PPW.

According to embodiments of the present invention, the ring shaped motor may be replaced by any other motor known in the art and suitable for the task (e.g. a torque motor).

The RTMSS' progression and the redundant tank wall cutting may be done simultaneously or separately in different rates. In the second case, at least one progression motor rotates an inner corona that is intermeshed with each PPW gearing to ensure equal rotation of each PPW, and another motor rotates a gearing that rotates an outer corona. The inner corona enables the progression and the outer corona is equipped with any of the cutting means that were mentioned above and is configured to cut the redundant tank wall.

According to embodiments of the present invention, in order to reduce weight and groove cutting power, the grooves 630 may be pre-cut externally, leaving thin internal layer to be cut during the RTMSS progression, or pre-cut internally leaving a closed external layer. The grooves are filled with a suitable filling material to provide a smooth internal surface. The filling material is removed by the groove cutters 455 as the PPWs 420 progress.

Before launch, the tank(s) may be pressurized by an external pressure source on the launch pad, to the level required for feeding the launcher engines at ignition. The external source is disconnected before launch. After ignition the required pressure in the tank(s) may be maintained by the motion of the piston(s).

The initial progression rate is predetermined and may be changed according to different parameters such as for example the pressure in the tank or the flight requirements versus the actual flight conditions, such as the launcher's velocity. According to embodiments of the present invention, there may be pressure measurement means such as a pressure sensor that measures the pressure in the tank. The pressure signal is passed to the motion control system, which may modify the RTMSS speed in order to keep the pressure in the tank within predetermined limits.

According to embodiments of the present invention, the RTMSS 210 may also comprise a pressure regulation module in order to assist in regulating the pressure in the tank(s). This takes the form of, for example, compressed Helium tank(s), similar to those in common use today, but of a much smaller size, since the volume(s) of gas above the propellant(s) are kept almost constant due to the motion of the RTMSS(s), thus the RTMSS either eliminates or reduces to a minimum the need for pressurization system commonly used in existing launchers.

FIG. 7 demonstrates a monopropellant launcher 700 with the present invention's RTMSS 210 mounted at the engine end of propellant tank 710.

FIG. 7A is a schematic view of section C-C of FIG. 7 comprising a propellant duct 720 configured to connect the propellant tank 710 with the launcher's motor(s) (not shown).

In cases where the RTMSS is installed in a bipropellant launcher, additional parts are required. Bipropellant launcher contains fuel and oxidizer that must be kept separate from each other, for example, LOX and kerosene. In order to keep the fuel and the oxidizer separate and at the same time provide them to the engine, a propellant duct assembly is connected between the farther propellant tank and the engine, as will be explained in detail below.

Figure 8:
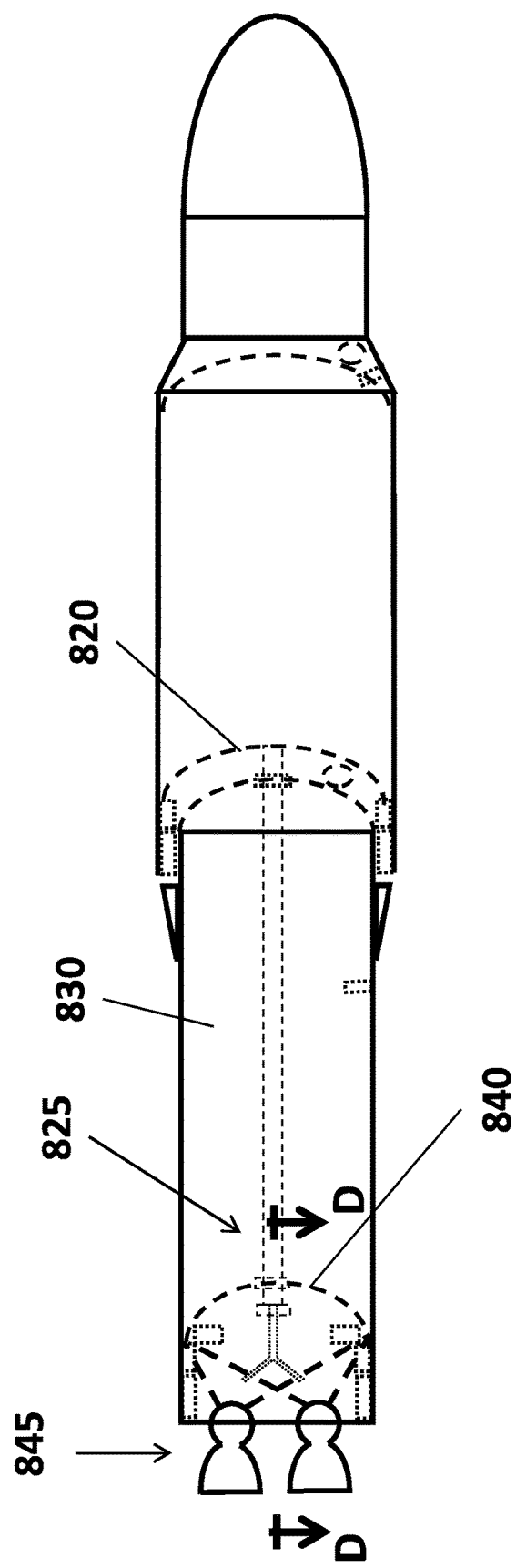
FIG. 8 demonstrates the propellant duct assembly installation in a bipropellant launcher according to embodiments of the present invention.
Figure 9A:
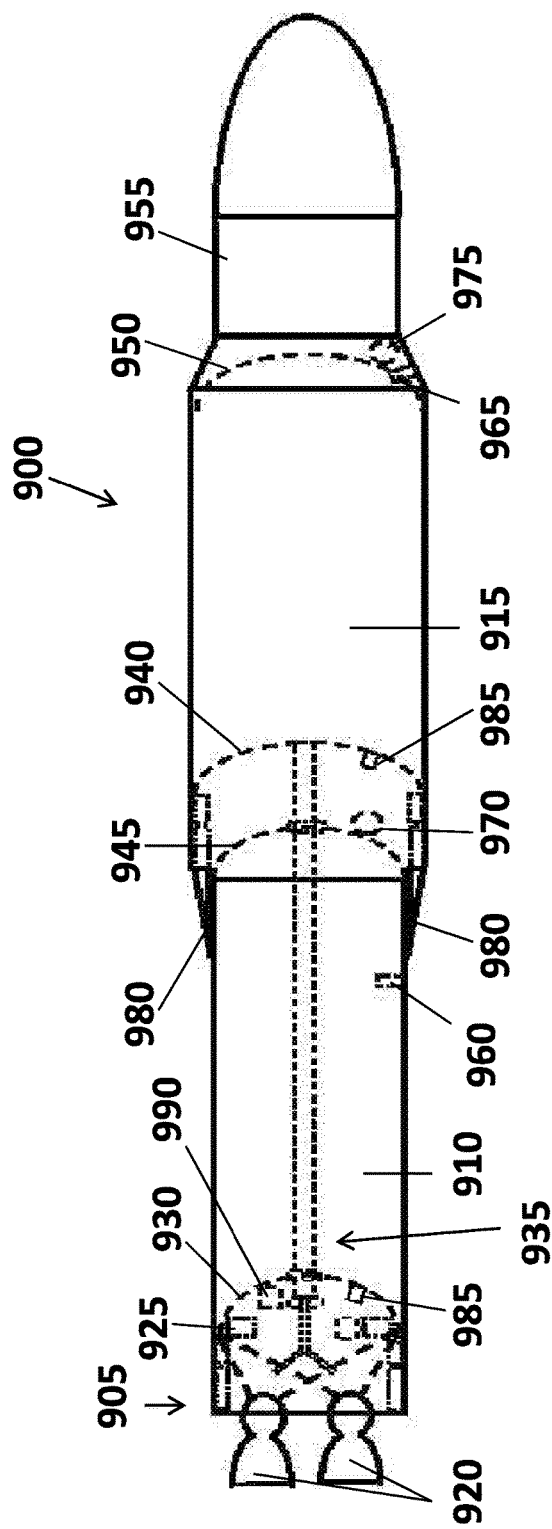
FIG. 9A demonstrates a bipropellant launcher with two of the present invention's RTMSS.

FIG. 8 demonstrates the propellant duct assembly (825) installation in a bipropellant launcher according to embodiments of the present invention. In this embodiment, the farther (from the engine) duct end is attached to the second tank piston 820, passing through the first tank 830 and the first tank piston 840 (with proper dynamic sealing) and into the engine area 845. The propellant duct assembly is configured to connect the propellant tank 915 with the launcher's motor(s) 920 (FIG. 9A).

FIG. 8A is a schematic view of section D-D of FIG. 8 comprising a first propellant duct 810 configured to connect the first (closer to the engine) propellant tank (not shown) with the launcher's engine(s) (not shown) and a second propellant duct assembly (822 and 820) configured to connect the second (farther from the engine) propellant tank (not shown) with the launcher's engine(s) (not shown).

The second propellant duct assembly comprises two parts:
1. Movable end 820.
2. Propellant duct 822.

Figure 8B:
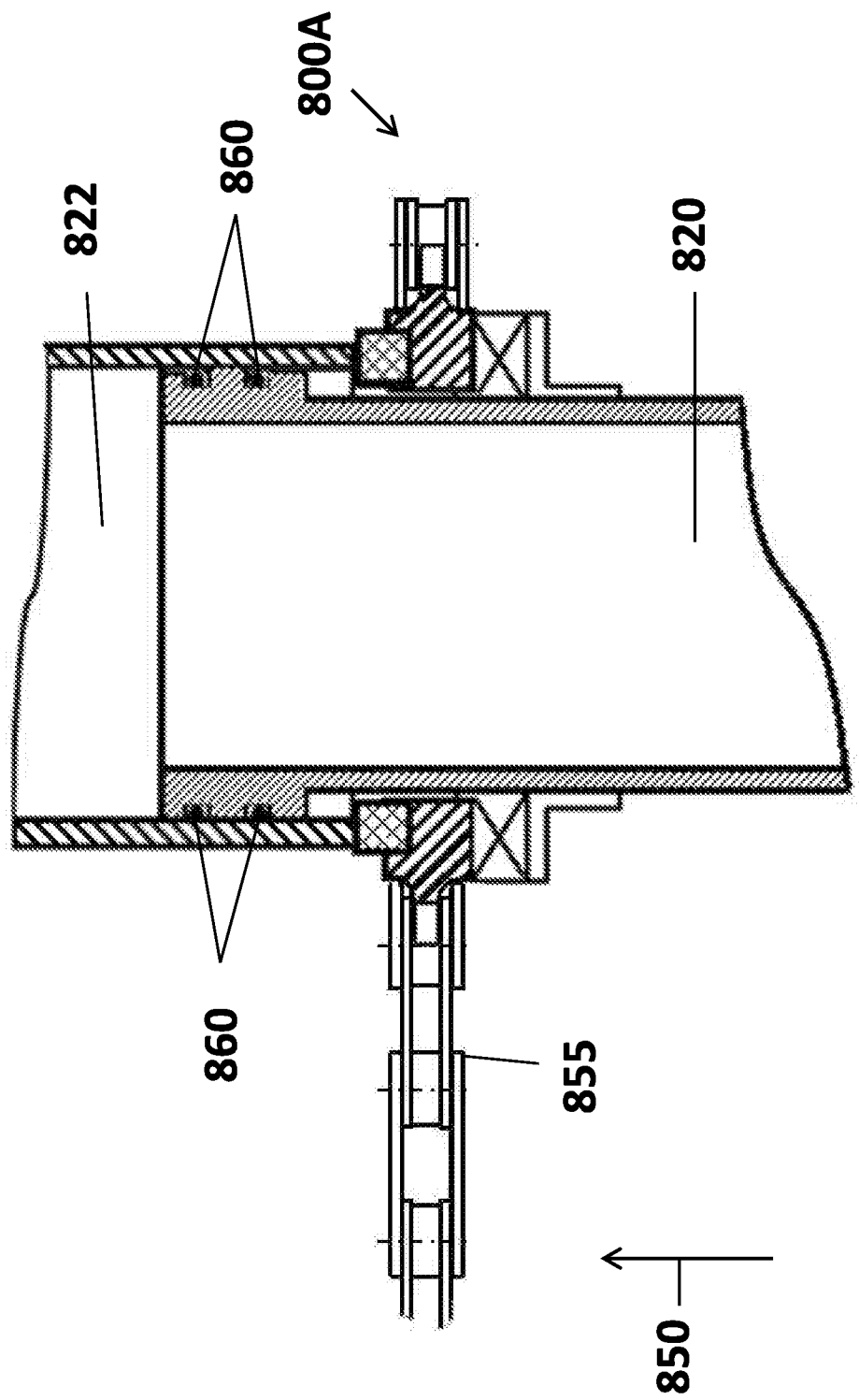
FIG. 8B is a schematic view of section E-E of FIG. 8A.

FIG. 8B is a schematic view of section E-E of FIG. 8A and demonstrates additional parts in RTMSS 210 that is mounted in a bipropellant launcher—propellant duct milling head parts 800A. According to embodiments of the present invention, the movable end 820 is mounted at the engine end of propellant duct 822 and part of it is mounted inside duct 822. As the RTMSS 210 progresses up the propellant tank in direction of arrow 850, the duct 822 is being constantly milled away by a propellant duct milling head 855 that is operated by a milling motor (not shown) in order to keep the duct in the corresponding length; and the movable end 820 is progressing up the duct in the same direction. In order to ensure proper sealing between the movable end 820 and the propellant duct 822 and prevent leakage during the process, a dynamic sealing 860 is needed (duct sealing). The dynamic sealing may be achieved, for example, by an "O" ring(s) and the like.

The energy source for driving the RTMSS, cutting the redundant tank wall and milling the redundant duct may be one of the following:

Dry batteries of high energy density and high reliability.
Thermal batteries.
A turbo generator powered by a compressed gas source.
A turbo generator powered by fuel or by the launcher's propellant.
Electrical power from the launcher engine's own electrical generation system.
Super capacitors.
Or any other light and reliable source of high energy density.

According to embodiments of the present invention the progression motor and/or the milling motor(s) may be fuel operated motors or any other motors known in the art and suitable for the task.

As mentioned above, the present invention's RTMSS may be installed in two types of launchers:
1. Bipropellant launchers.
2. Monopropellant launchers.

In the bipropellant launcher, two tanks are used, fuel and oxidizer; therefore, according to embodiments of the present invention, two RTMSS are necessary.

FIG. 9A demonstrates a bipropellant launcher 900 with two of the present invention's RTMSS mounted one in the engine end 905 and the other between the propellant tanks (fuel and oxidizer) 910 and 915, at the beginning of the process. In this embodiment the upper tank should have a larger diameter than the lower tank, to provide clearance between the excess upper tank wall edge and the lower tank exterior.

The launcher also comprises an engine(s) 920, avionics 925, lower piston 930, a propellant duct assembly 935, upper piston 940, lower propellant tank upper dome 945, upper propellant tank upper dome 950, a pressure sensor 985 for each propellant tank, a motion control system 990 and a payload 955.

The launcher may also comprise at least one ground pressurization system 960 and 965 for each propellant tank 910 and 915 respectively; at least one flight pressurization system 970 and 975 for each propellant tank 910 and 915 respectively and an aerodynamic fairing/shield 980 that is configured to avoid damage from shed pieces of the upper tank redundant wall.

Figure 9B:
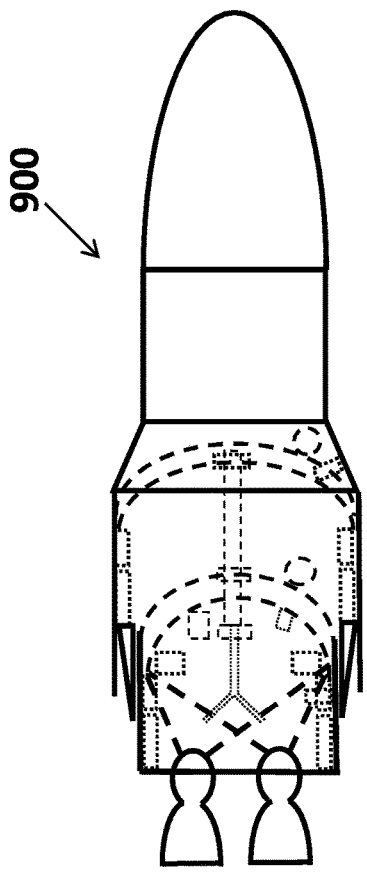
FIG. 9B demonstrates the bipropellant launcher of FIG. 9A at the end of the process.

FIG. 9B demonstrates the bipropellant launcher 900 of FIG. 9A at the end of the process;

In the monopropellant launcher, one propellant tank is used; therefore one RTMSS 210 is necessary.

Figure 10:
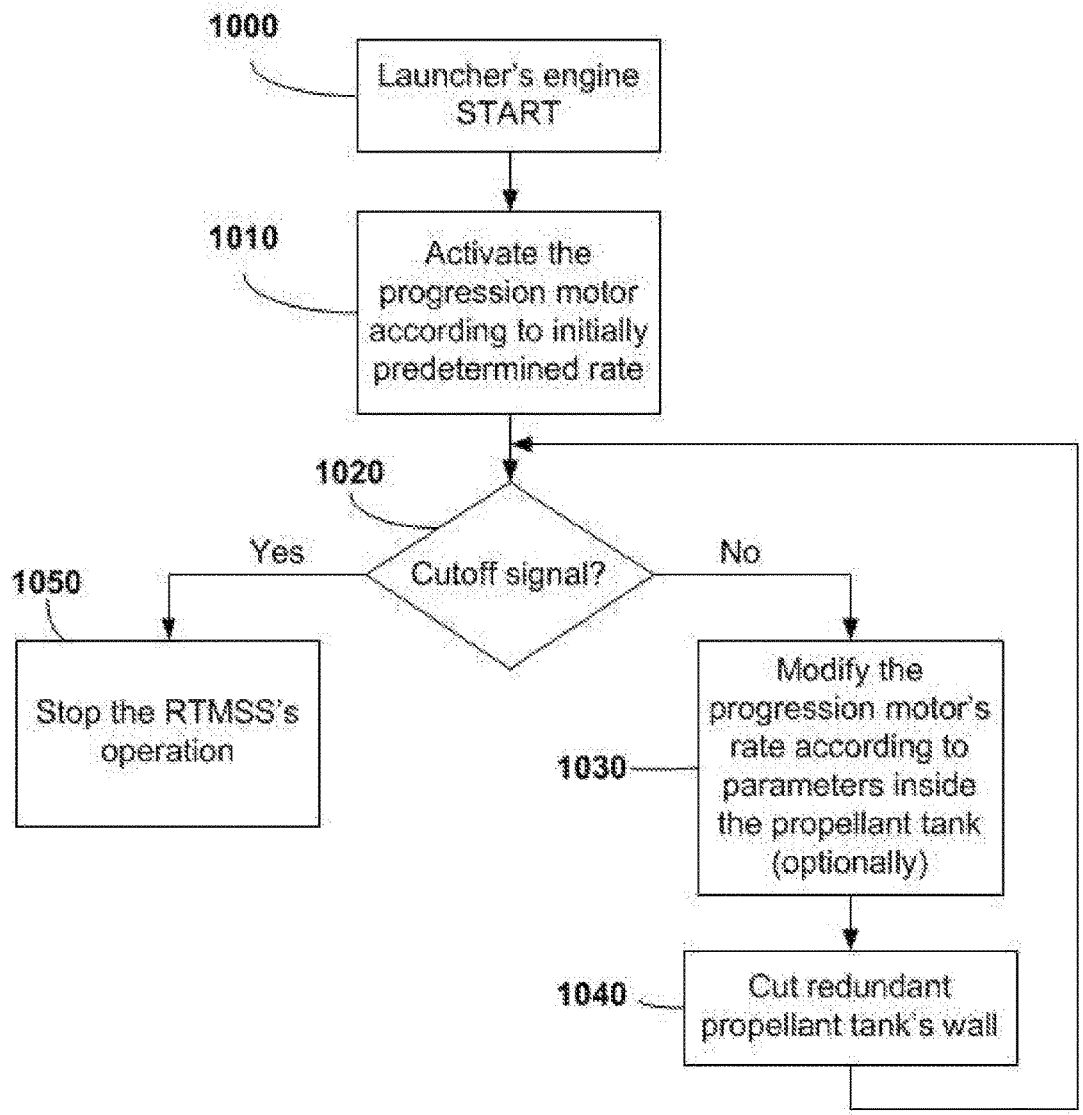
FIG. 10 is an exemplary flowchart showing the process performed by the RTMSS in a monopropellant launcher according to embodiments of the present invention.

FIG. 10 is an exemplary flowchart showing the process performed by the RTMSS in a monopropellant launcher according to embodiments of the present invention.

The RTMSS of the present invention is triggered by the ignition of the launcher's engine (step 1000). In step 1010 the RTMSS' motion control system activates the progression motor 310 according to an initially predetermined rate. The predetermined rate may be determined according to the geometry of the tank and the rate of propellant consumption. While the engine is running, propellant is burning and parameters are changing (e.g. the pressure in the tank). In step 1020 the RTMSS is continuously checking if a cutoff signal has been received. If it hasn't, in step 1030, the motion control system may modify the progression motor's 310 rate according to these parameters (e.g. according to the pressure inside the propellant tank). In step 1040 the RTMSS cuts the redundant propellant tank's wall according to a predetermined program (as explained above in conjunction with FIGS. 6B and 6C) and goes back to step 1020. If a cutoff signal has been received, in step 1050, the motion control system stops the RTMSS's operation.

The cutoff signal is a signal from the launcher that the process is done (burn out).

According to embodiments of the present invention, as explained above, a bipropellant launcher may comprise two RTMSSs. In such embodiment, the upper (farther from the engine) RTMSS is operating according to the flowchart of FIG. 10 and the lower (closer to the engine) RTMSS is operating according to the flowchart of FIG. 11.

Figure 11:
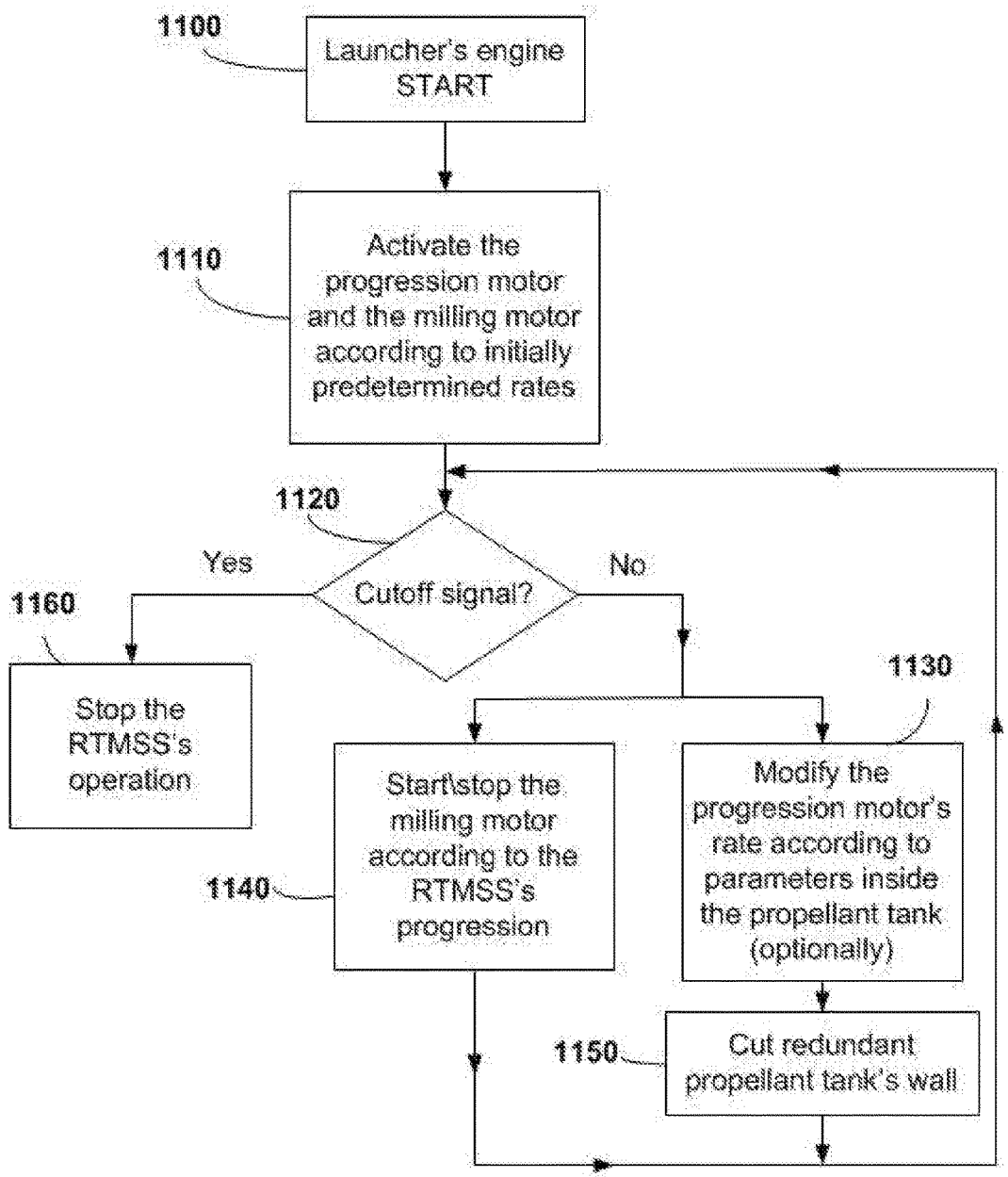
FIG. 11 is an exemplary flowchart showing the process performed by the RTMSS in bipropellant launcher according to embodiments of the present invention.

FIG. 11 is an exemplary flowchart showing the process performed by the lower RTMSS in a bipropellant launcher according to embodiments the present invention.

The RTMSS of the present invention is triggered by the ignition of the launcher's engine (step 1100). In step 1110 the RTMSS' motion control system activates the progression motor 310 and the milling motor according to predetermined rates. The predetermined rate may be determined according to the geometry of the tank and the rate of propellant consumption. While the engine is running, propellant is burning and parameters are changing (e.g. the pressure in the tank). In step 1120 the RTMSS is continuously checking if a cutoff signal has been received. If it hasn't, in steps 1130 and 1140, the motion control system may modify the progression motor's 310 rate according to these parameters (e.g. according to the pressure inside the propellant tank) and may start or stop the milling motor correspondingly in order keep the propellant duct in a corresponding length. In step 1150 the RTMSS cuts the redundant propellant tank's wall according to a predetermined program (as explained above in conjunction with FIGS. 6B and 6C) and goes back to step 1120. If a cutoff signal has been received, in step 1160 the motion control system stops the RTMSS's operation.

The cutoff signal is a signal from the launcher that the process is done (burn out).

Figure 12:
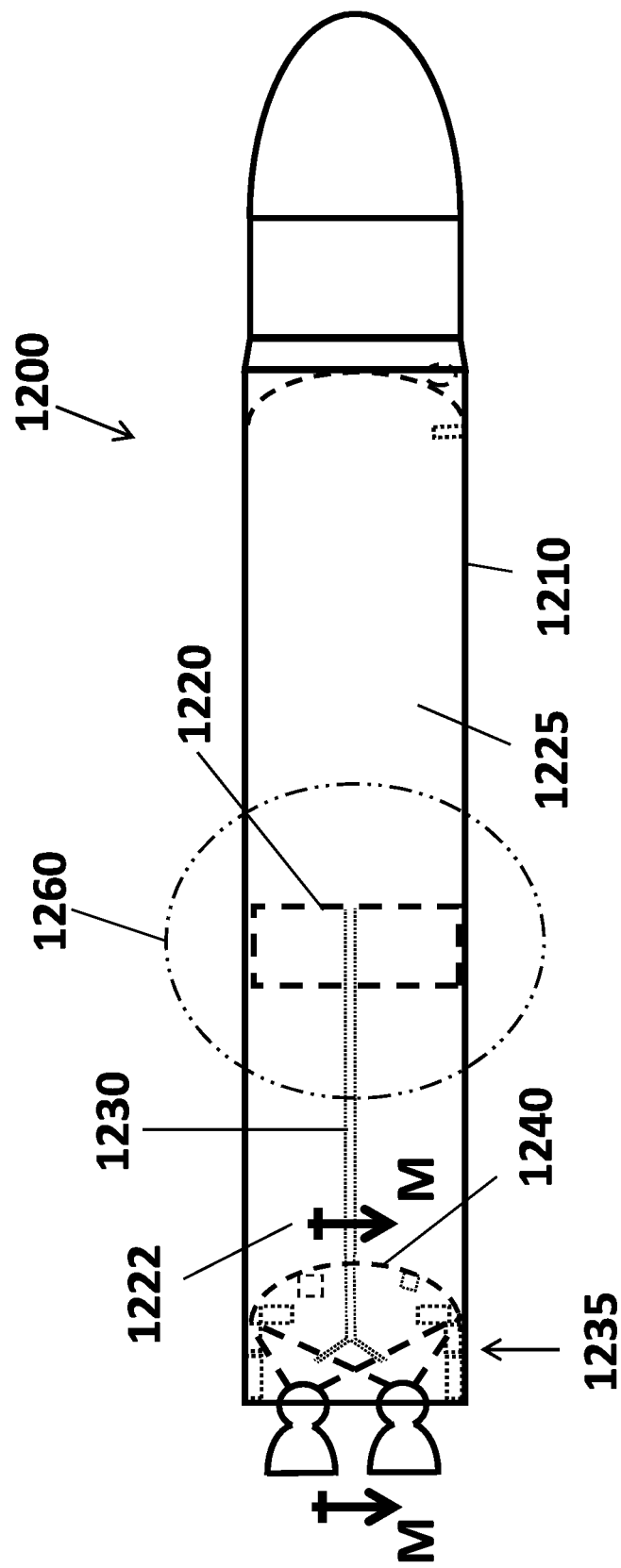
FIG. 12 is another embodiment of the present invention.

According to embodiments of the present invention, as demonstrated in FIG. 12, a bipropellant launcher 1200 has both propellants contained in the same tank structure 1210, of constant diameter, separated from each other by a moving piston 1220 (middle piston) with proper sealing and cleaning systems (not shown). The middle piston 1220 divides the tank into two parts 1222 and 1225, which may have different lengths, and together with RTMSS 1235, controls the pressure in both parts of the tank as required by the launcher's engine(s). A dual duct 1230 comprising two concentric ducts, extends down from the middle piston 1220, through RTMSS dome 1240 and is configured to connect the RTMSS to the middle piston. The dual duct 1230 comprises an external duct attached to the middle piston 1220 on one side and into the RTMSS area on its other side, with dynamic sealing (not shown) between the duct 1230 and the RTMSS dome 1240; and an internal propellant duct (not shown), extending from the upper side of the middle piston 1220 into the launcher's engine(s) area. The space between the external duct and the propellant duct is used for exhausting gas as will be explained below. At the lower end of the propellant duct there is a milling head (similar to the one described above in conjunction with FIG. 8B), that mills the ends of both ducts simultaneously. A movable end is inserted into the bottom of the propellant duct, with dynamic sealing between them (duct sealing), as described above in conjunction with FIG. 8B.

The initial progression rates of both the RTMSS and the middle piston are predetermined and may be changed according to different parameters such as for example the pressure in each side of the tank or the flight requirements versus the actual flight conditions, such as the launcher's velocity. According to embodiments of the present invention, there may be pressure measurement means such as an upper pressure sensor and a lower pressure sensor that measure the pressure in both sides of the tank. The pressure signals are passed to the motion control system, which may modify the RTMSS speed and\or the middle piston progression rate in order to keep the pressure in both sides of the tank within predetermined limits.

Figure 13:
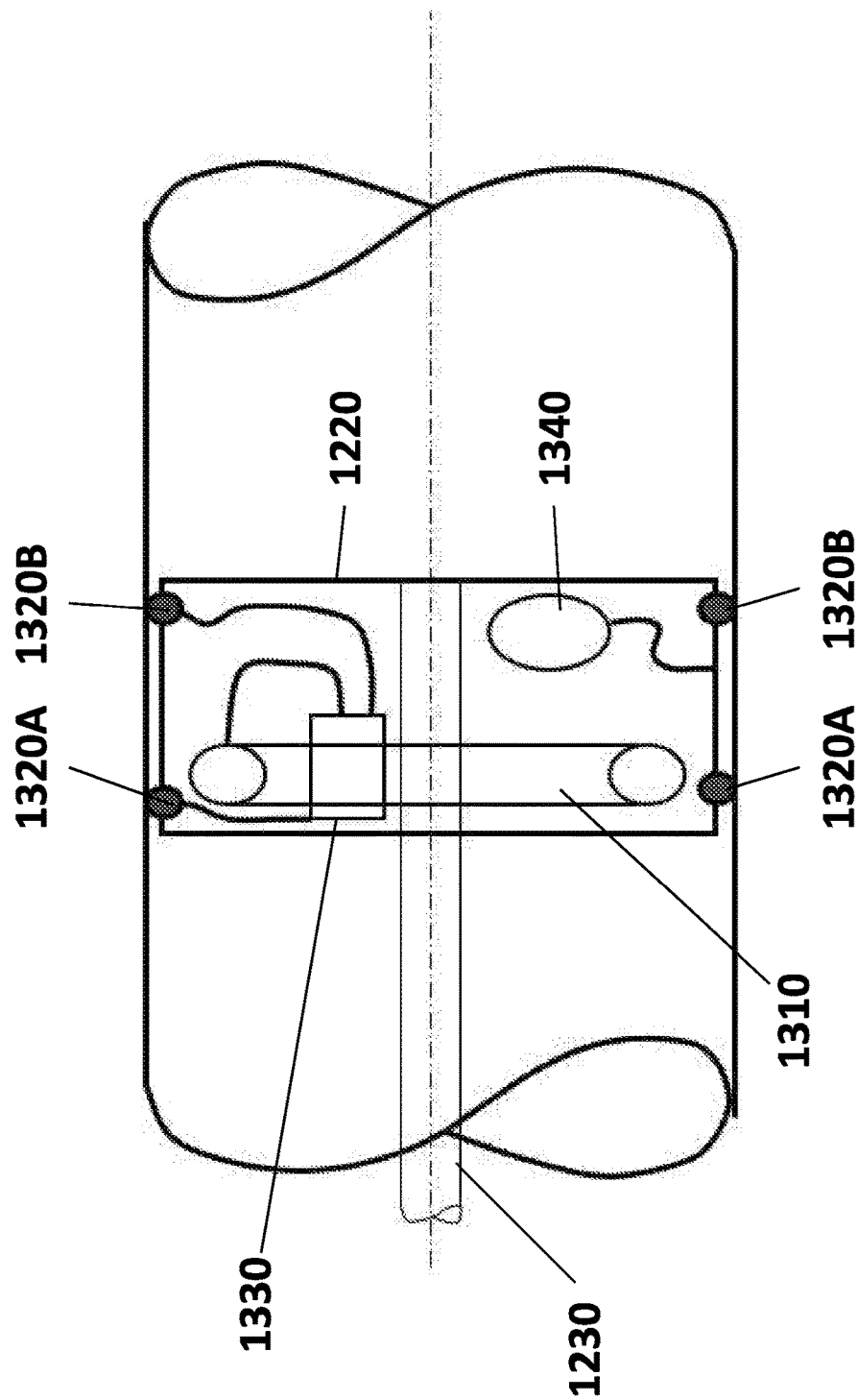
FIG. 13 is an enlargement of detail 1260 of FIG. 12.

FIG. 13 is an enlargement of detail 1260 of FIG. 12, showing the middle piston 1220 and part of the dual duct 1230. According to embodiments of the invention, the middle piston 1220 comprises a pressure tank 1310 for dynamic sealing 1320A and 1320B (middle piston sealing), such as for example inflatable sealing, dynamic sealing pressure control 1330 and a gas tank 1340.

The middle piston must provide sealing between the propellant tanks. The sealing is provided, for example, by the inflatable sealing, the pressure tank and the pressure control system. In order to wipe off any trace of the upper propellant from the wall of the tank, the gas tank, that may contain Halon or another gas with fire extinguishing and cleaning qualities known in the art, injects the gas through orifices in the circumference of the middle piston, between the sealing 1320A and 1320B, and a spiral seal wipes and collects the gas with the remnants of the propellant, into a drain pipe leading down through the dual duct 1230 (between the external duct and the propellant duct).

Figure 14:
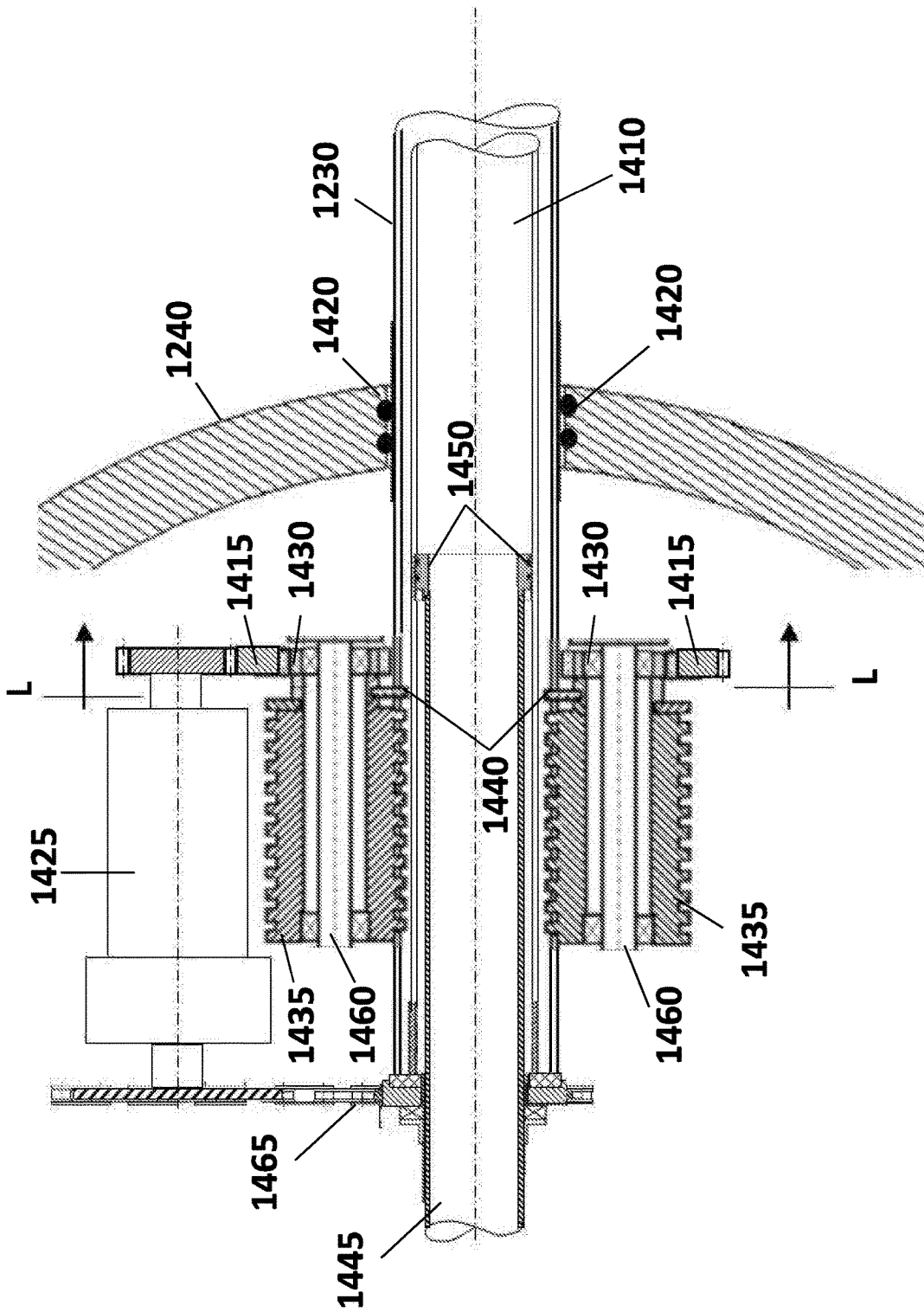
FIG. 14 is a schematic view of section M-M of FIG. 12.

FIG. 14 is a schematic view of section M-M of FIG. 12, comprising the dual duct 1230, which comprises a propellant duct 1410; proper sealing 1420 between the external duct and the RTMSS dome 1240, at least one duct motor 1425, a plurality of duct propelling worms (DPW) 1435, DPW gearings 1430, DPW shafts 1460, a double sided corona gear 1415 (duct cogwheel), DPW groove cutters 1440, a moveable end 1445 with its dynamic sealing 1450 (such as the moveable end 820 of FIG. 8B) and a dual duct milling head 1465 (such as the propellant duct milling head of FIG. 8B).

The plurality of duct propelling worms (DPW) 1435 are arranged around the external duct 1230 and may move the external duct and the middle piston relative to the RTMSS (1235 OF FIG. 12). A double sided corona gear 1415 is intermeshed on its inner side with the DPW gearing 1430 on each DPW 1435, and with at least one duct motor 1425 on its outer side. The motor(s) is controlled by a motion control system to move the external duct by means of the gearing and the DPW. The same motor may also operate the dual duct milling head 1465, or a second motor may be used. The DPW groove cutters 1440 cut grooves into the outside of the external duct 1230. The rotating DPW pull the external duct down or push it up, as required, to move the middle piston in the required direction.

In operation, the middle piston 1220 has to move up a shorter distance than RTMSS 1235, thus it has to move up slower. This relative motion between the middle piston and the RTMSS is achieved by pulling the middle piston down by the DPW 1435.

Figure 15:
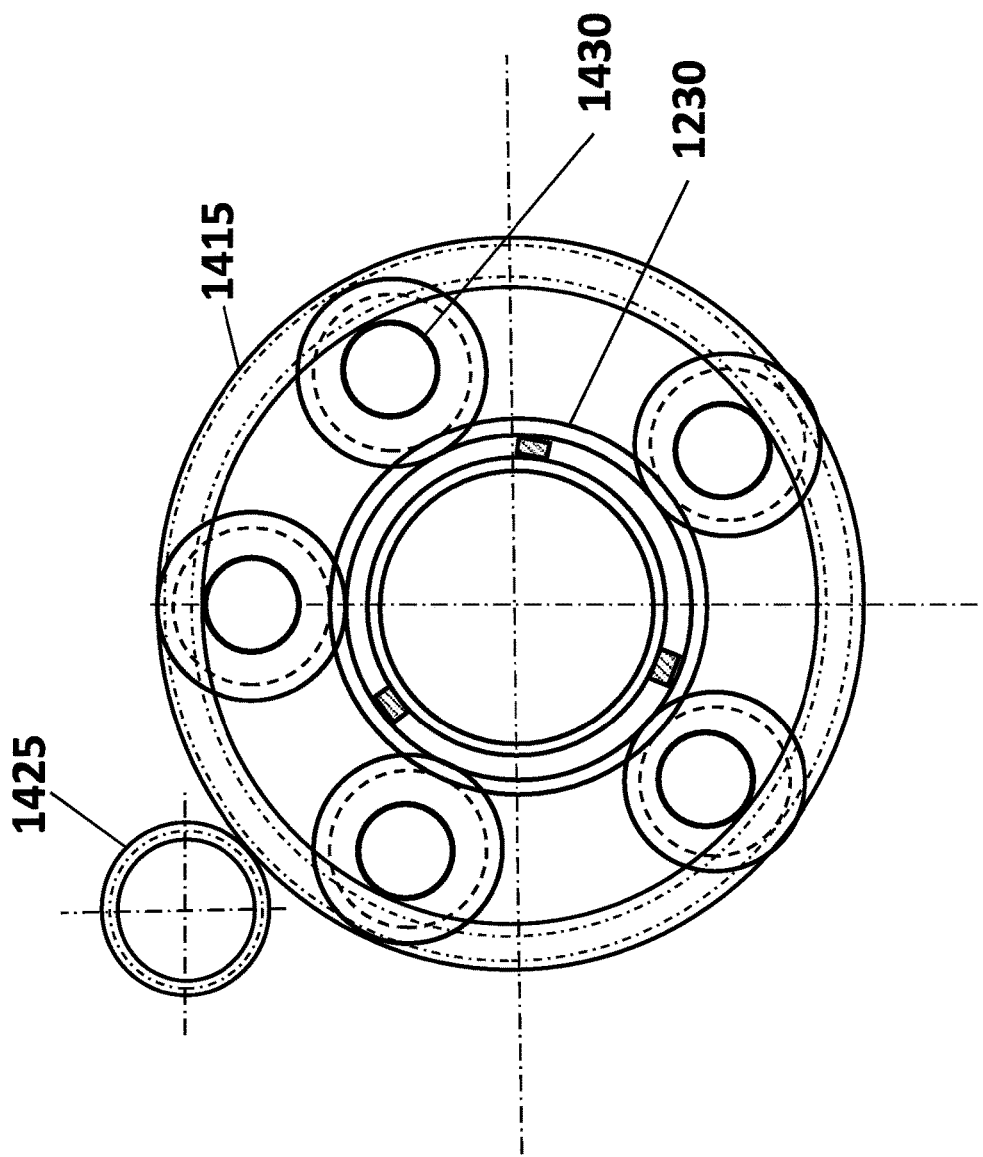
FIG. 15 is a schematic view of section L-L of FIG. 14.

FIG. 15 is a schematic view of section L-L of FIG. 14, showing the double sided corona gear 1415, duct motor 1425, DPW gearings 1430 and the dual duct 1230.

According to embodiments of the present invention, the duct motor 1425 may be a ring shaped motor or any other motor known in the art and suitable for the task. In such embodiment, the double sided corona gear 1415 (duct cogwheel) may intermeshed with the ring shaped motor on its inner side and with each DPW 1435 on its outer side; and a separate motor operates the milling head.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A system for shedding redundant launcher tank mass, comprising progressing means, and cutting means configured to cut redundant propellant tank wall, said system configured to progress inside said tank using said progressing means, along said tank wall in an initially predetermined rate, and cut said redundant propellant tank wall during said progression;

wherein said progressing means comprise:
a plurality of piston propelling worms (PPWs), each worm comprising at least one PPW groove cutter and configured to rotate around an individual PPW shaft via an individual PPW gearing.

2. The system of claim 1 further comprising:
a piston;
an energy source; and piston sealing means configured to seal gap between said piston and said propellant tank wall;
wherein said progressing means further comprise:
- a progression cogwheel connected with each of said individual PPW gearings; and
- a ring shaped motor connected with said progression cogwheel and configured to rotate said progression cogwheel which rotates each of said individual PPW gearings;

said energy source configured to provide energy to said ring shaped motor.

3. The system of claim 2, wherein said energy source comprises at least one battery; said at least one battery comprises one of dry battery and thermal battery.

4. The system of claim 2, wherein said energy source comprises a turbo generator; said turbo generator comprises one of a compressed gas powered generator and a fuel powered generator.

5. The system of claim 2, wherein said energy source comprises one of a launcher engine's own electrical generation system and super capacitors.

6. The system of claim 2, further comprising:
- a propellant duct milling head configured to mill a propellant duct; and
- a milling motor configured to rotate said propellant duct milling head, said motor energized by said energy source.

7. The system of claim 2, further comprising:
- a pressure sensor configured to measure the pressure in the propellant tank; and
- a motion control system configured to modify said progression rate.

8. The system of claim 7, further configured to progress along said tank wall in a variable rate dependent on said pressure in the propellant tank.

9. The system of claim 2, further comprising shaft supports.

10. The system of claim 1 further comprising:
- a piston;
- an energy source; and
- piston sealing means configured to seal a gap between said piston and said propellant tank wall;
wherein said progressing means further comprise:
- a corona connected with said plurality of individual PPW gearings; and
- at least one progression motor, each motor connected with one of said individual PPW gearings and configured to rotate said connected individual PPW gearing which rotates said corona;
said energy source configured to provide energy to said at least one progression motor.

11. The system of claim 1, wherein said cutting means comprise vertical and circumferential cutting means.

12. The system of claim 1, wherein said cutting means comprise mechanical cutting means; said mechanical cutting means comprise one of endmill and cutter.

13. The system of claim 1, wherein said cutting means comprise one of laser cutting means and shaped charge cutting rings.

14. The system of claim 13, wherein said shaped charge cutting rings are hanged by one of straps connected to said rings upper side and straps connected to said rings lower side.

15. The system of claim 13, wherein said shaped charge cutting rings each comprising a protective shield configured to protect each ring from an explosion of another ring.

16. A monopropellant launcher comprising the system of claim 1.

17. A system for shedding redundant launcher tank mass, comprising
a first sub-system comprising:
- progressing means; and
- cutting means configured to cut redundant propellant tank wall; and
a second sub-system configured to divide said propellant tank;
said first and second sub-systems are connected to each other via a dual duct;
- said first sub-system is configured to progress inside said tank, along said tank wall in initially predetermined first progression rate; and
- said second sub-system is configured to progress inside said tank, along said tank wall in initially predetermined second progression rate.

18. A bipropellant launcher comprising the system of claim 17.

19. The system of claim 17, wherein said first sub-system further comprises:
- a piston mounted inside the lower side of said propellant tank;
- an energy source;
- piston sealing means configured to seal a gap between said piston and said propellant tank wall;
- a dual duct milling head;
- a milling motor;
- a plurality of duct propelling worms (DPWs), each worm comprising at least one individual DPW groove cutter and configured to rotate around an individual DPW shaft via an individual DPW gearing;
- a duct cogwheel connected with each of said individual DPW gearings; and
- a duct motor connected with said duct cogwheel and configured to rotate said duct cogwheel which rotates each of said individual DPW gearings;
wherein said progression means comprise:
- a plurality of piston propelling worms (PPWs), each worm comprising at least one individual PPW groove cutter and configured to rotate around an individual PPW shaft via an individual PPW gearing;
- a corona connected with said plurality of individual PPW gearings;
- at least one progression motor, each motor connected with one of said individual PPW gearings and configured to rotate said connected individual PPW gearing which rotates said corona;
wherein said second sub-system further comprises:
- a middle piston mounted inside said propellant tank;
- middle piston sealing means configured to seal a gap between said middle piston and said propellant tank wall;
- a cleaning system mounted in said middle piston;
- a gas tank mounted in said middle piston and configured to provide gas to said cleaning system; and
wherein said dual duct comprises a propellant duct which is part of a propellant duct assembly connecting the upper side of said propellant tank and at least one launcher engine;
- said dual duct milling head configured to mill said dual duct comprising said propellant duct;
- said milling motor configured to rotate said dual duct milling head; and
- said energy source configured to provide energy to said at least one progression motor, said duct motor and said milling motor.

20. The system of claim 17, wherein said first sub-system further comprises:
- a piston mounted inside the lower side of said propellant tank;
- an energy source;
- piston sealing means configured to seal a gap between said piston and said propellant tank wall;
- a dual duct milling head;
- a milling motor;
- a plurality of duct propelling worms (DPWs), each worm comprising at least one individual DPW groove cutter and configured to rotate around an individual DPW shaft via an individual DPW gearing;
- a duct cogwheel connected with each of said individual DPW gearings; and
- a duct motor connected with said duct cogwheel and configured to rotate said duct cogwheel which rotates each of said individual DPW gearings;

wherein said progressing means comprise:
- a plurality of piston propelling worms (PPWs), each worm comprising at least one individual PPW groove cutter and configured to rotate around an individual PPW shaft via an individual PPW gearing;
- a progression cogwheel connected with each of said individual PPW gearings; and
- a ring shaped motor connected with said progression cogwheel and configured to rotate said progression cogwheel which rotates each of said individual PPW gearings;

wherein said second sub-system further comprises:
- a middle piston mounted inside said propellant tank;
- middle piston sealing means configured to seal a gap between said middle piston and said propellant tank wall;
- a cleaning system mounted in said middle piston; and
- a gas tank mounted in said middle piston and configured to provide gas to said cleaning system;

wherein said dual duct comprises a propellant duct which is part of a propellant duct assembly connecting the upper side of said propellant tank and at least one launcher motor;
- said dual duct milling head configured to mill said dual duct comprising said propellant duct;
- said milling motor configured to rotate said dual duct milling head; and
- said energy source configured to provide energy to said ring shaped motor, said duct motor and said milling motor.

21. The system of claim 20, wherein said duct motor and said milling motor are the same motor.

22. The system of claim 20, wherein said duct motor is a ring shaped motor.

23. The system of claim 20, wherein said energy source comprises at least one battery; said at least one battery comprises one of dry battery and thermal battery.

24. The system of claim 20, wherein said energy source comprises a turbo generator; said turbo generator comprises one of a compressed gas powered generator and a fuel powered generator.

25. The system of claim 20, wherein said energy source comprises one of a launcher engine's own electrical generation system and super capacitors.

26. The system of claim 20, further comprising:
- an upper pressure sensor configured to measure the pressure in an upper side of said propellant tank;
- a lower pressure sensor configured to measure the pressure in a lower side of said propellant tank; and
- a motion control system configured to modify said first and second progression rates.

27. The system of claim 26, further configured to progress along said tank wall in variable rates dependent on said pressures in said propellant tank.

28. The system of claim 20, further comprising shaft supports.

29. The system of claim 20, wherein said propellant duct assembly comprises a propellant duct, a movable end and duct sealing means configured to seal a gap between said propellant duct and said movable end.

* * * * *